United States Patent

Tamura et al.

[11] Patent Number: 5,934,646
[45] Date of Patent: Aug. 10, 1999

[54] GATE VALVE AND CYLINDER APPARATUS

[75] Inventors: Yuzuru Tamura; Isamu Kinno, both of Kanagawa, Japan

[73] Assignee: Nok Corporation, Tokyo, Japan

[21] Appl. No.: 09/055,187

[22] Filed: Apr. 6, 1998

[30] Foreign Application Priority Data

Apr. 4, 1997 [JP] Japan .................................... 9-086719

[51] Int. Cl.⁶ .................................................. F16K 3/16
[52] U.S. Cl. .......................................... 251/193; 251/203
[58] Field of Search .................................. 251/193, 203, 251/204

[56] References Cited

U.S. PATENT DOCUMENTS 5,120,019 6/1992 Davis, Jr. ................................. 251/193
5,626,324 5/1997 Nakamura et al. ....................... 251/58
5,755,255 5/1998 Iwabuchi ............................. 251/203 X

FOREIGN PATENT DOCUMENTS 8-128542 5/1996 Japan .

*Primary Examiner*—John Fox
*Attorney, Agent, or Firm*—Jacobson, Price, Holman & Stern, PLLC

[57] ABSTRACT

A gate valve in which the structure is simplified and inexpensive, movement of a valve body is smooth and high in speed, a force of inclination moving the valve body is strong, and a sealing property of an opening portion can be improved. The gate valve has a valve body capable of sealing the opening portion; a valve rod to which the valve body is fixed; a roller rotatably provided on the other end portion of the valve rod; a roller receiving member having a first holding portion for holding the roller when the valve rod moves the roller straight, an inclined surface for inclining the valve rod, and a second holding portion for holding the roller when the valve rod is inclined up to a predetermined angle; a driving means for moving the roller receiving member straight; and stoppers limiting the straight movement of the valve rod at predetermined positions at which the valve body closes the opening portion. This gate valve is preferably driven by the cylinder apparatus.

4 Claims, 18 Drawing Sheets

GATE VALVE AND CYLINDER APPARATUS

BACKGROUND OF THE INVENTION

1. Field of the Invention

The present invention relates to a gate valve capable of opening, closing, and sealing an opening portion of a vacuum process chamber used in for example the manufacturing process of a semiconductor device.

The present invention also relates to a cylinder apparatus suitable for driving a gate valve etc., more particularly relates to a cylinder apparatus suitable for driving a gate valve capable of opening, closing, and sealing an opening portion of a vacuum process chamber.

2. Description of the Related Art

In a dry etching step, sputtering step, epitaxial wafer forming step, etc. in the manufacturing process of a semiconductor device, use has been made for example of a vacuum process apparatus of a multi-chamber structure comprising a plurality of vacuum process chambers connected with each other as shown in FIG. 1.

In the vacuum process apparatus 101 illustrated in FIG. 1, a plurality of vacuum process chambers 105 for performing various processing are connected to the outer circumference of a transport chamber 102 to and from which a wafer W is transported. Movement of the wafer W between the transport chamber 102 and each vacuum process chamber 105 is carried out through a gate G. The opening, closing, and sealing of the gate G are carried out by a not illustrated gate valve.

In the illustrated vacuum process apparatus 101, the wafer W is transported into the transport chamber 102 by a transport device (not illustrated) through an inlet and outlet port 103 of an inlet and outlet path 104 and held by a vacuum transport robot 107 provided in the transport chamber 102. When the wafer W is held by the vacuum transport robot 107, the inlet and outlet port 103 is closed and the interior of the transport chamber 102 is evacuated. At this time, the gate valves are made to seal the gates G. When the evacuation of the transport chamber 102 is completed, the gate valves are driven to open the gates G, and the wafer W is transported to a predetermined vacuum process chamber 105 by the vacuum transport robot 107. In order to perform processing such as dry etching in the vacuum process chamber, the gate valves are driven to close the gates G, and predetermined processing such as dry etching is carried out on the wafer W. When the predetermined processing of the wafer W is completed, the gate valves are driven to open the gates G, and the wafer W is taken out of the vacuum process chamber 105 again by the vacuum transport robot 107 and automatically taken to the outside of the vacuum process apparatus 101 through the inlet and outlet port 103.

As a gate valve capable of opening, closing, and sealing the gate G in the vacuum process apparatus 101 as described above, for example a gate valve having a cross-sectional structure shown in FIG. 2 and FIG. 3 has been known.

In FIG. 2, a transport chamber 202 corresponding to the transport chamber 102 of FIG. 1 is connected with a vacuum process chamber 203 corresponding to the vacuum process chamber 105 of FIG. 1 through the gate G. The opening and closing of this gate G are carried out by a gate valve 201. The gate valve 201 has a valve body 205 performing opening, closing, and sealing of the gate G, a valve rod 206 to one end portion of which this valve body 205 is fixed, which is held so that it can move straight, and which can be inclined about a predetermined axis 208, a seal bellows 207 for sealing between the transport chamber 202 and the valve rod 206, and a not illustrated driving means for moving the valve rod 206 straight and inclining it.

The gate valve 201 illustrated in FIG. 2 is shown in a state where the gate G is opened. In order to close and then seal the gate G, as shown in FIG. 3, the valve rod 206 is moved straight and then moved up to a position at which the valve body 205 closes the gate G and the valve rod 206 is inclined about the axis 208. As a result, the valve body 205 presses against an O-ring 204 provided at the outer circumference of the gate G and seals the gate G.

In the gate valve 201 having the above structure, it is required that the sealing property when sealing the gate G by the valve body 205 be good, that there be no sliding part generating particles due to friction with the valve body 205 and the valve rod 207 provided in the transport chamber 202, that the movement of the valve body 205 by the not illustrated driving means be smooth and possible at a high speed, that the force for inclining the valve body 205 for crushing the O-ring 204 in order to secure a sufficient seal be sufficient, that the structure be simple and inexpensive, and so on.

In the gate valve 201 having the above structure, however, in order to perform the straight movement and inclination of the valve rod 207, sufficiently obtain a force for inclining the valve body 205, and operate the valve body 205 smoothly and at a high speed, the structure of the driving means for driving the valve rod 207 becomes complex. As a result, there are the disadvantages that the number of parts becomes large and the gate valve 201 becomes expensive.

A cylinder driven by compressed air (hereinafter referred to as an air cylinder) is usually used for driving the valve rod 206 of the gate valve 201 of the above structure. When an air cylinder is used for driving the valve rod 206. When the valve rod 206 is inclined so as to press against the O-ring 204, a moment will act upon the air cylinder from the valve rod 206 as a reaction force. However, usually, an air cylinder is not structured to be able to support a large moment applied to a piston rod. An air cylinder not structured to be able to support a large moment applied to a piston rod has the disadvantage that if the moment is repeatedly applied to the piston rod, wear and fatigue are apt to occur in constituent parts such as the piston, cylinder, and sealing member and there is insufficient durability with respect to moment.

SUMMARY OF THE INVENTION

An object of the present invention is to provide a gate valve which is simplified in structure and inexpensive, is smooth and high speed in movement of the valve body, a strong in the force for inclining the valve body, and is improved in the sealing property of the opening portion.

Another object of the present invention is to provide a cylinder apparatus improving the durability with respect to the moment acting upon the piston rod.

Still another object of the present invention is to provide a cylinder apparatus suitable for driving a gate valve.

According to a first aspect of the invention, there is provided a gate valve of the following configuration. The gate valve has a valve body provided in a sealed chamber, capable of opening and closing an opening portion of the sealed chamber, and capable of sealing the opening portion by inclination with respect to the opening portion; a valve rod to one end portion of which the valve body is fixed, held so that it can move straight and incline, provided so as to project from an interior of the sealed chamber to an outside of the sealed chamber, and provided so as to hold the sealed state of the sealed chamber by a sealing means; an inclination mechanism connected to the valve rod and inclining the valve rod; and a driving means connected to the valve rod via the inclination mechanism and supplying a drive force required for the straight movement and inclination of the valve rod. The inclination mechanism has a roller rotatably provided on the other end of the valve rod; a roller receiving member formed with a first holding portion provided facing the other end portion of the valve rod, capable of holding the roller, and holding the roller when the valve rod moves straight in a direction opening and closing the opening portion, with an inclined surface continuous with the first holding portion, capable of engaging with the roller, and engaging with the roller so as to make the valve rod incline, and with a second holding portion continuous with the inclined surface, capable of holding the roller, and holding the roller when the valve rod is inclined up to a predetermined angle and moved straight by the driving means; and a limiting means for limiting the straight movement of the valve rod at a predetermined position at which the valve body closes the opening portion and releasing the holding state of the roller receiving member of the roller by the first holding portion. When the roller receiving member is moved straight in a direction closing the opening portion from a state where the valve body opens the opening portion, the roller receiving member moves the valve rod straight to the predetermined position in a state where the roller is held by the first holding portion. When the roller receiving member is further moved straight, the holding state of the roller by the first holding portion is released, the roller is engaged with the inclined surface, and the valve rod inclines to seal the opening portion. When the valve rod is inclined up to a predetermined angle, the roller is held by the second holding portion.

In the gate valve of this aspect of present invention, when the roller receiving member is moved straight in a direction closing the opening portion of the sealed chamber by the driving means, the valve rod moves straight in a state of the first holding portion holding the roller, and when the valve rod reaches the predetermined position, the movement of the valve rod is limited and the valve body closes the opening portion. When the roller receiving member moves further straight, the valve rod does not move and only the roller receiving member moves, the state where the roller is held at the first holding portion is released, and the roller rolls on the inclined surface while rotating, whereby the valve rod is inclined. At this time, the straight movement force of the roller receiving member is amplified by a wedge effect of the inclined surface, and the inclination force of the valve body is amplified. By this, the sealing of the opening portion by the valve body is carried out well. When the valve rod is inclined by a predetermined angle by a further straight movement of the roller receiving member, the roller is in a state where it is held at the second holding portion of the roller receiving member, and the sealing operation of the opening portion by the valve body is completed.

According to a second aspect of the present invention, a gate valve having the following configuration is provided. The gate valve has a valve body provided in a sealed chamber, capable of opening and closing an opening portion of the sealed chamber and then sealing the opening portion by inclining with respect to the opening portion; a valve rod to one end portion of which the valve body is fixed, held so that it can move straight and incline, provided so as to project from an interior of the sealed chamber to an outside of the sealed chamber, and provided so as to hold the sealed state of the sealed chamber by a sealing means; an inclination mechanism connected to the valve rod and inclining the valve rod; a driving means connected to the valve rod via the inclination mechanism and supplying a drive force required for the straight movement and inclination of the valve rod; and a holding means for holding the valve rod and the inclination mechanism moved straight by the driving means so that they can freely move in a horizontal direction.

Preferably, the holding means has a rail horizontally arranged along the direction of straight movement of the valve rod and first and second movement members moveably provided on the rail; the valve rod is held by the first movement member so that it can freely incline; and the inclination mechanism is held by the second movement member.

According to a third aspect of the present invention, there is provided a gate valve of the following configuration. The gate valve has a valve body provided in a sealed chamber, capable of opening and closing an opening portion of the sealed chamber, and capable of sealing the opening portion by inclination with respect to the opening portion; a valve rod to one end portion of which the valve body is fixed, held so that it can move straight and incline, and provided so as to project from an interior of the sealed chamber to an outside of the sealed chamber and hold the sealed state of the sealed chamber by a sealing means; an inclination mechanism connected to the valve rod and inclining the valve rod; a driving means connected to the valve rod via the inclination mechanism and supplying a drive force required for the straight movement and inclination of the valve rod; and a lock mechanism for holding the sealed state of the opening portion by the valve body. The driving means is a cylinder apparatus having a piston rod, one end of which is connected to the inclination mechanism via a connection plate, a piston fixed to the other end of the piston rod, and a cylinder unit for accommodating this piston inside it. The lock mechanism has a lock plate which is fixed to the connection plate along the drive direction of the piston rod, on one surface of which an inclined guide surface being formed, and in which a lock hole is formed in a direction perpendicular to the drive direction of the piston rod, a small cylinder provided at a predetermined position with respect to the cylinder apparatus, and a lock piston accommodated in the small cylinder, on one end of which a lock pin capable of being fit in the lock hole by being guided by the inclined guide surface is formed, and the other end of which is biased by a resilient member so as to project to a position at which the lock pin can abut against one surface of the lock use plate from the small cylinder. A supply port for supplying a compressed fluid for driving the lock piston in a direction in which the lock pin is accommodated in the small cylinder into the small cylinder is formed in the small cylinder. The supply port is communicated with a supply path for supplying the driving medium for driving the valve body in an opening direction into the cylinder unit of the cylinder apparatus. When the cylinder apparatus is driven in a direction sealing the opening portion by the valve body, the lock pin is guided by the inclined guide surface of the lock use plate and fit in the lock use hole, the movement of the connection plate is locked, and the sealed state by the valve body is held. When the cylinder apparatus is driven in a direction opening the opening portion by the valve body, the compressed fluid is supplied into the small cylinder through the supply path to the cylinder apparatus, and the engagement between the lock pin and the lock hole is released.

According to a fourth aspect of the present invention, there is provided a cylinder apparatus having a piston rod, a piston fixed on one end of this piston rod, and a cylinder unit for accommodating this piston inside it so that it can slide; driving the piston by a driving medium supplied to the internal portion of the cylinder unit and capable of moving the piston rod straight; and further having a support mechanism capable of supporting the piston rod against a moment acting upon the piston rod.

Preferably, the cylinder apparatus is used for driving a gate valve having a mechanism capable of opening and closing an opening portion of a sealed chamber by straight movement of the valve body and then capable of sealing the opening portion by the inclination of the valve body; and the support mechanism can support the piston rod against a reaction force moment acting upon the piston rod at the time of inclination of the valve body.

More preferably, the support mechanism of the cylinder apparatus has a support shaft formed at a front end of the piston and a support hole into which the support shaft can be inserted formed at a position facing the piston inside the cylinder unit.

Preferably, a bushing fitting with the support shaft is placed in the support hole.

More preferably, the support shaft is integrally formed with the piston rod.

BRIEF DESCRIPTION OF THE DRAWINGS

These and other objects and features of the present invention will be more apparent from the following description of preferred embodiments given with reference to the accompanying drawings, wherein:

FIGS. 6A to 6C are views of the relative positional relationships between a roller and a roller receiving member illustrated in FIG. 4 and FIG. 5, in which FIG. 6A is a view of the relative positional relationship in a state where the valve body opens an opening portion; FIG. 6B is a view of the relative positional relationship in a state where the valve body closes the opening portion; and FIG. 6C is a view of the relative positional relationship in a state where the valve body seals the opening portion;

FIG. 17 is a sectional view of a state where the lock by the lock mechanism is released and FIG. 18 is a sectional view of a state where a lock pin and an inclined guide surface of a lock plate abut against each other.

DESCRIPTION OF THE PREFERRED EMBODIMENTS

Below, preferred embodiments of a gate valve and cylinder apparatus of the present invention will be explained referring to the attached drawings.

First Embodiment

A first embodiment of the present invention will be explained by referring to FIG. 4 to FIG. 11.

Figure 1:
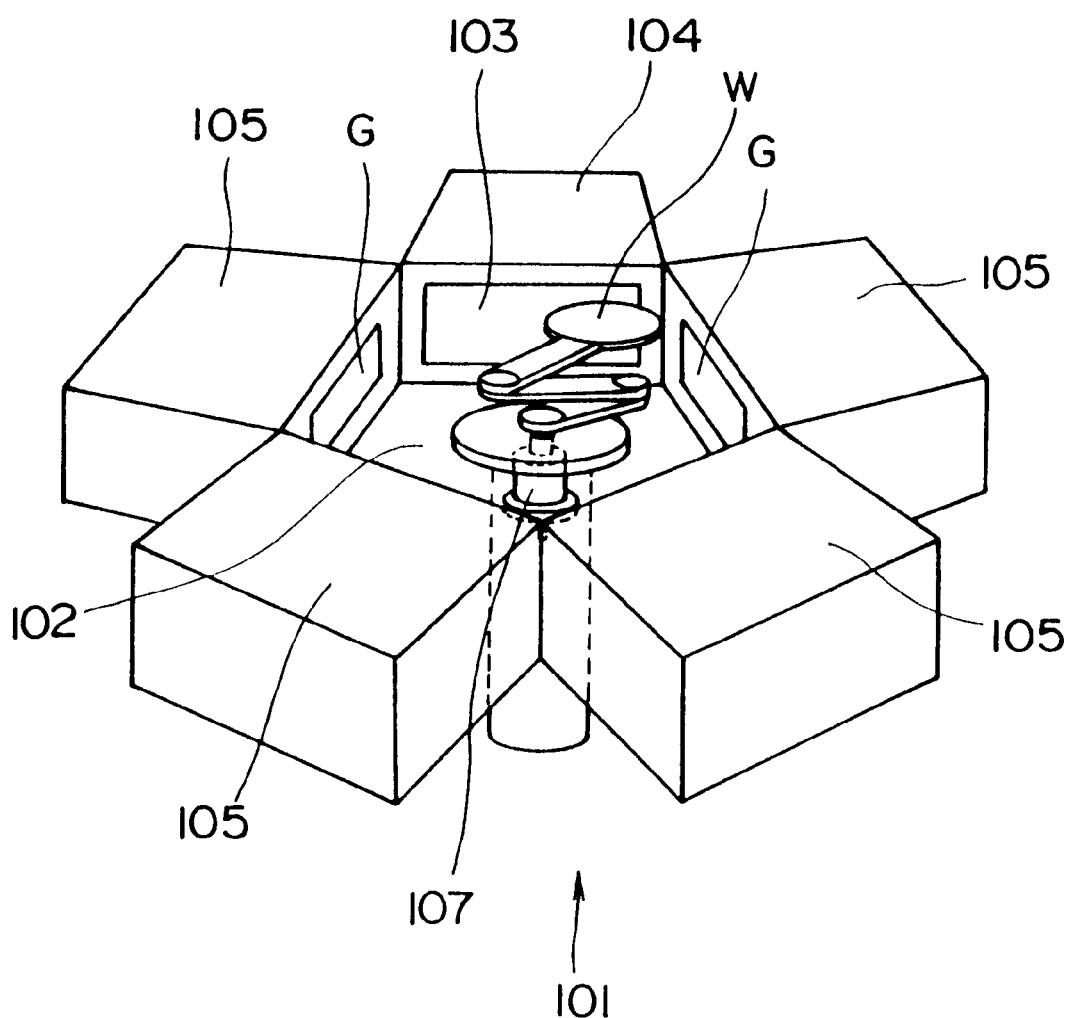
FIG. 1 is a perspective view of an example of a vacuum process apparatus having a multi-chamber structure.
Figure 2:
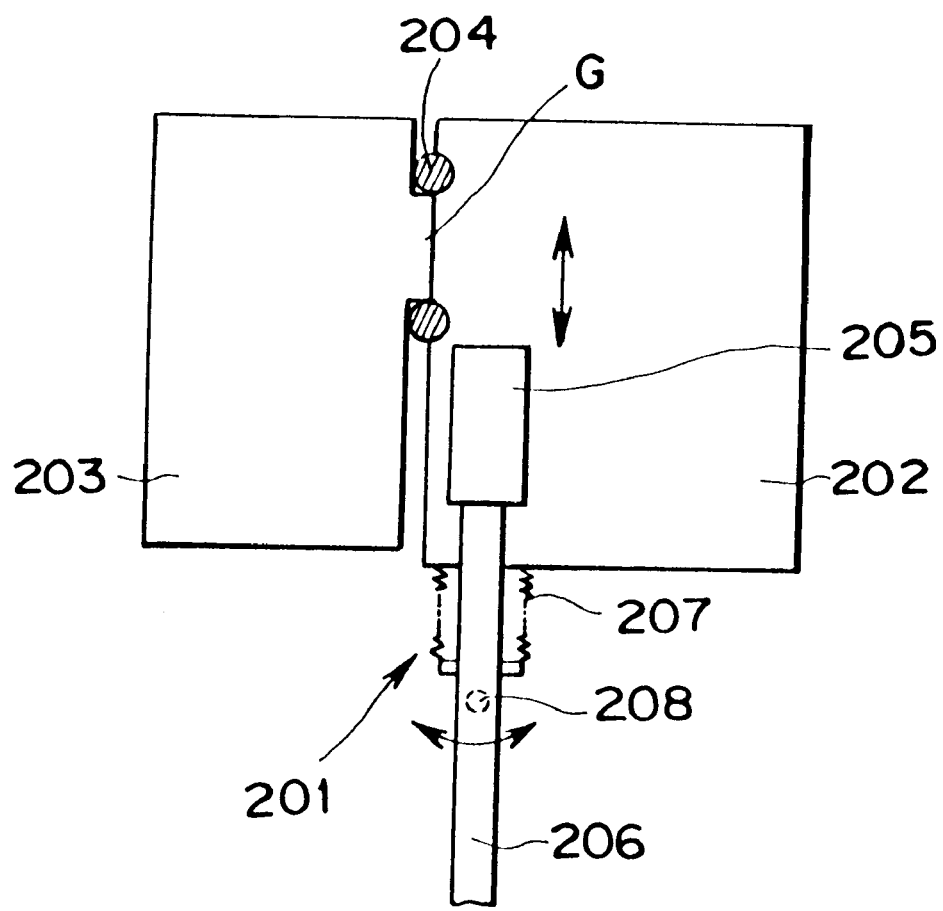
FIG. 2 is a sectional view of an example of a structure of a gate valve used in FIG. 1.
Figure 3:
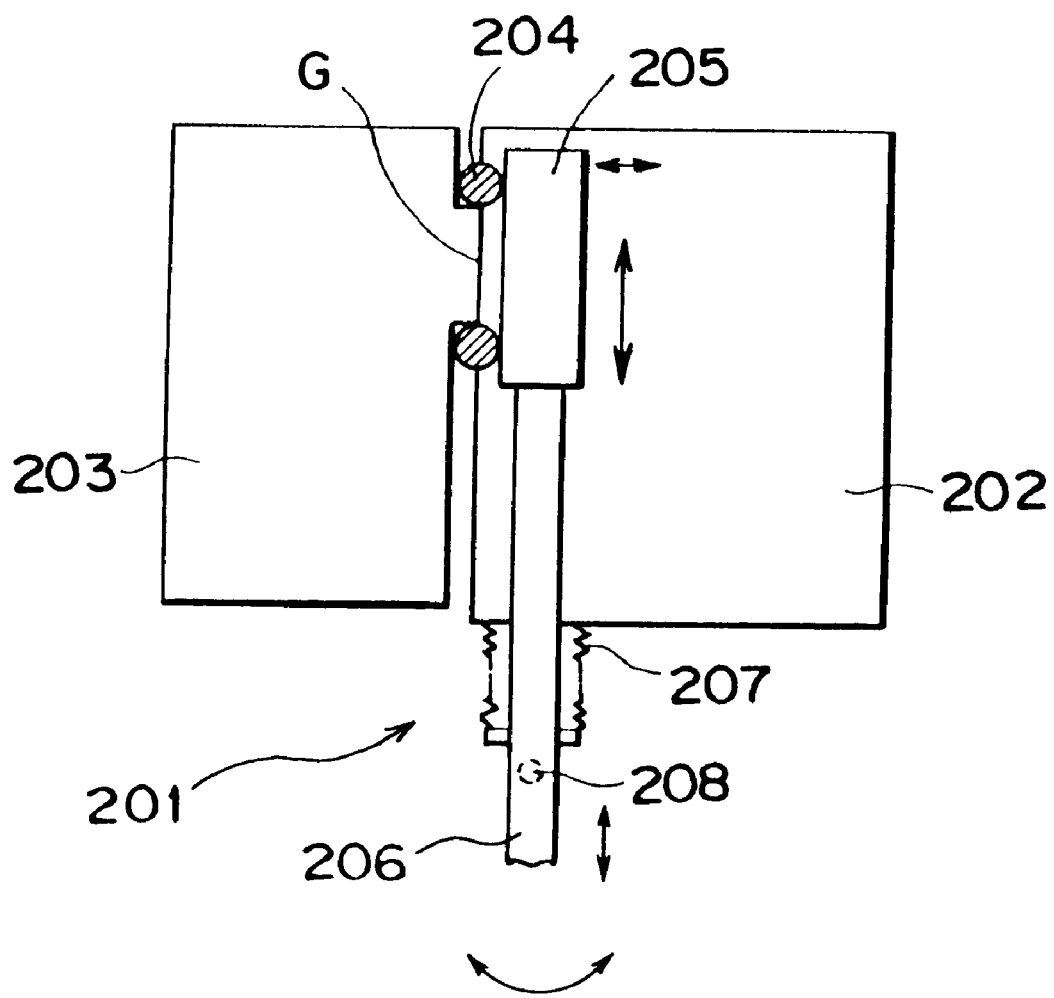
FIG. 3 is a view of a state where the gate is closed by the gate valve illustrated in FIG. 2 and the vacuum chamber of a transport chamber is sealed.
Figure 4:
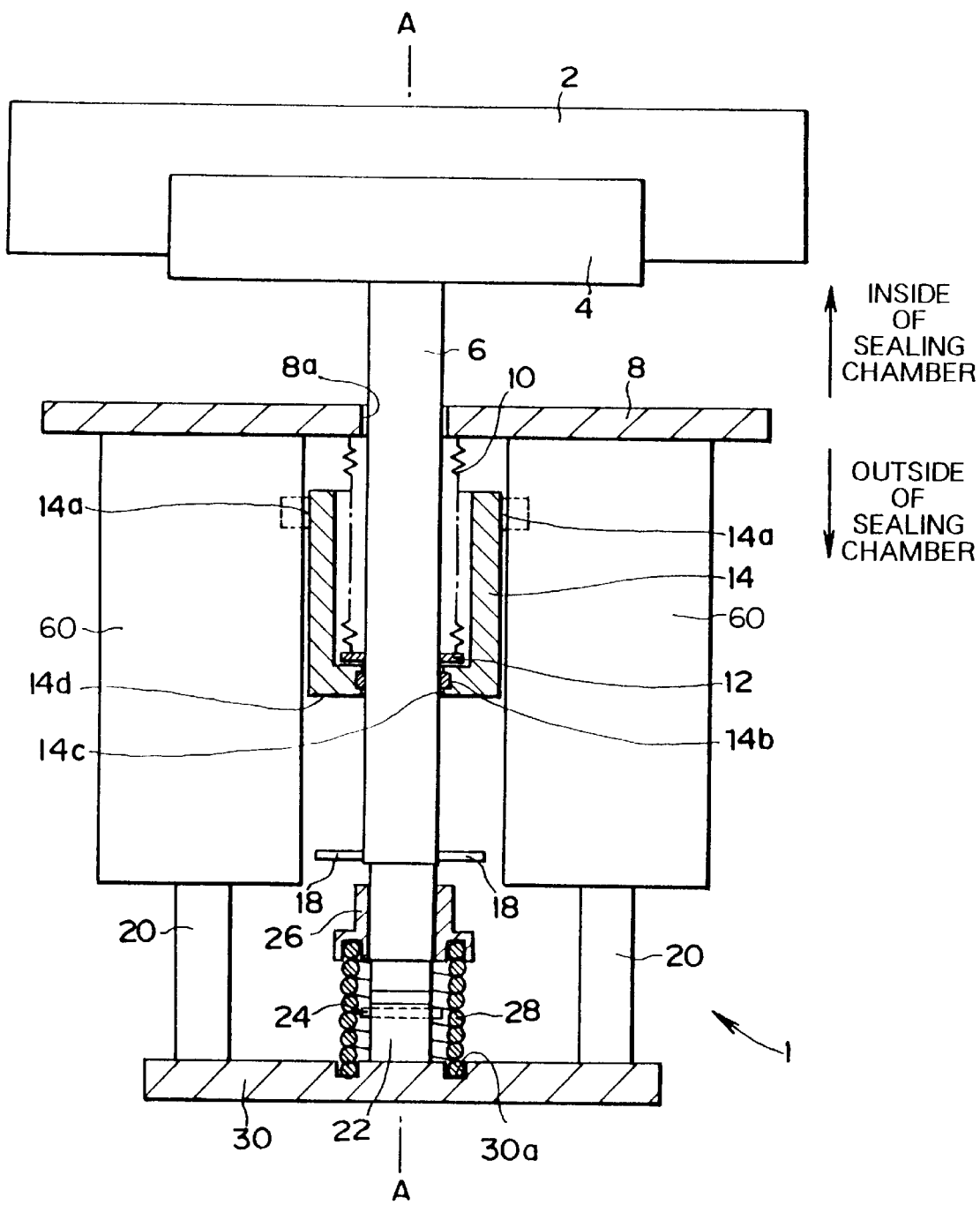
FIG. 4 is a sectional view of the gate valve used in the vacuum process apparatus illustrated in FIG. 1 according to a first embodiment of the gate valve according to the present invention.

FIG. 4 is a sectional view of the gate valve used in the vacuum process apparatus illustrated in FIG. 1 according to a first embodiment of the gate valve according to the present invention.

Figure 5:
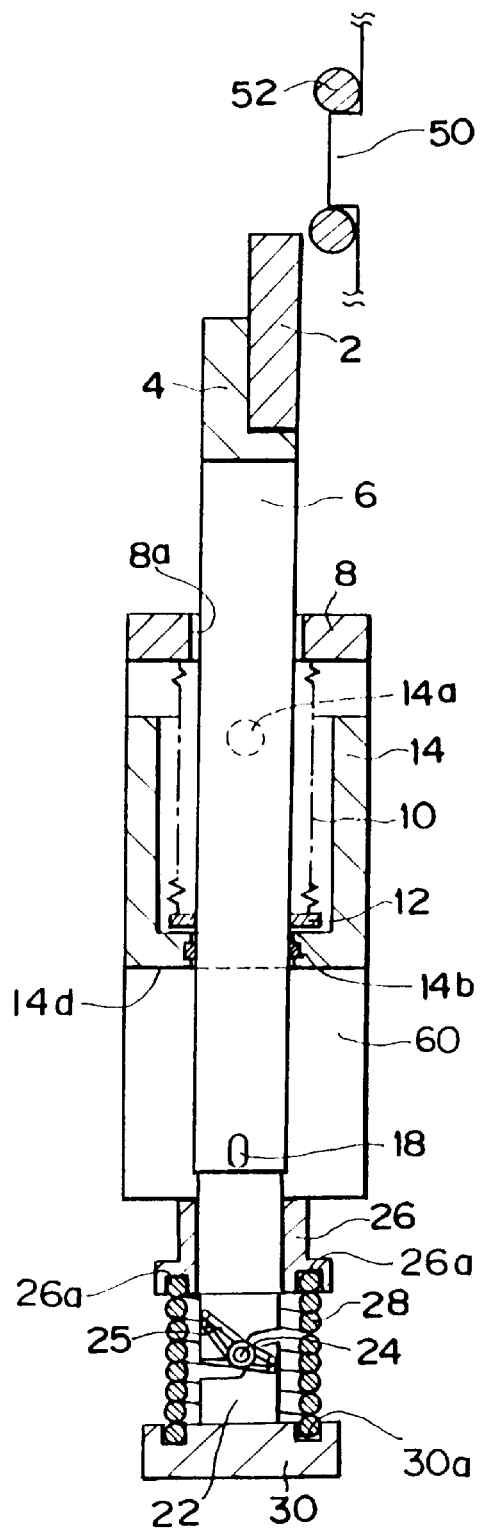
FIG. 5 is a sectional view of the gate valve shown in FIG. 4 in an A—A line direction.

FIG. 5 is a sectional view of the gate valve shown in FIG. 4 along the direction of the line A—A.

As illustrated in FIG. 4 and FIG. 5, a gate valve 1 of the embodiment of the present invention has a valve body 2 and a valve rod 6 to one end of which the valve body 2 is fixed via a connection member 4. The gate valve 1 further has an attachment member 8 attached to a sealed chamber (not illustrated) of the vacuum process apparatus illustrated in FIG. 1, a seal bellows 10 for sealing between an insertion hole 8a into which the valve rod 6 of the attachment member 8 is inserted and the valve rod, and a holding member 14 for holding the valve rod 6 so that it can move straight and then can be inclined about a shaft 14a. The gate valve 1 further has a cylinder apparatus 60 of the type driven by compressed air (air cylinder) which rotatably holds the shaft 14a of the holding member 14 and, at the same time, drives a piston rod 20. The gate valve 1 has two stoppers 18 and 18 fixed to positions opposite to the outer circumference of the valve rod 6, a roller 24 rotatably provided at the other end portion of the valve rod 6, a roller receiving member 22 arranged facing the other end portion of the valve rod 6 provided with this roller 24, a connection plate 30 for connecting the roller receiving member 22 and the piston rod 20, and a coil spring 28 with both end portions fixed by a fixing member 26 affixed to the other end portion of the valve rod 6 and the connection plate 30 and connecting the other end portion of the valve rod 6 and the connection plate 30. These members are basic constituent elements of the gate valve 1. The other constituent elements of the gate valve 1 will be explained in the following description.

The valve body 2 is formed by a flat plate-like member, can open and close an opening portion 50 of the sealed chamber (not illustrated) in a vacuum process apparatus 101 of FIG. 1, and then can seal the opening portion 50 via an O-ring 52 by inclination with respect to the opening portion 50 as illustrated in FIG. 5. In the present embodiment, the flat plate-like member is shown as the valve body 2, but it is also possible to shaped it to match a curved surface if the opening portion has a curved shape. Further, as a material for forming the valve body 2, a material such as a metal material which does not generate particles much at all and does not discharge gas or the like, for example, stainless steel (SUS), is desirable. The valve body 2 and the connection member 4 are connected by for example a bolt.

The valve rod 6 has one end affixed to the valve body 2 via the connection member 4 and projects to the outside of the sealed chamber (not illustrated) of the vacuum process apparatus 101 illustrated in FIG. 1 from the insertion hole 8a of the attachment member 8. The valve rod 6 and the connection member 4 are connected by for example welding. Further, the valve rod 6 is held by the holding member 14 so that it can move straight via an O-ring 14b. The holding member 14 can freely rotate about the shaft 14a. Therefore, the valve rod 6 can also be inclined about the shaft 14a. As the material for forming the valve rod 6, a material such as a metal material which does not generate particles much at all and does not discharge gas or the like, for example, SUS, is desirable.

The attachment member 8 is attached to for example a sealed chamber capable of sealing the internal portion of the transport chamber etc. of the vacuum process apparatus of the multi-chamber structure illustrated in FIG. 1. As the material for forming the attachment member 8, a material such as a metal material which does not generate particles much at all and does not discharge gas or the like, for example, SUS, is desirable.

The seal bellows 10 is a member for sealing between the insertion hole 8a of the attachment member 8 and the valve rod 6 and can extend and contract along with the straight movement and inclination of the valve rod 6. Further, the seal bellows 10 is formed by a metal material, for example, SUS. One end portion of the seal bellows 10 is fixed by a bonding means, for example, welding, while holding the sealed state, at the outer circumference of the insertion hole 8a of the attachment member 8, while the other end portion of the seal bellows 10 is fixed to the fixing ring 12 fitted and fixed to the valve rod 6 by a bonding means, for example, welding. By this, even if the valve rod 6 moves straight and inclines, the sealed chamber of the vacuum process apparatus 101 illustrated in FIG. 1 can be sealed and contaminants such as particles from the outside can be prevented from entry.

The holding member 14 is a cylindrical member having a bottom. An insertion hole 14c for inserting the valve rod 6 is formed in the bottom portion. Shafts 14a are formed on the outer circumference at positions facing each other. The holding member 14 holds the valve rod 6 inserted into the insertion hole 14c so that it can freely move straight via the O-ring 14b. The shaft 14a is rotatably supported at the air cylinder apparatus 60 and therefore holds the valve rod 6 so that it can be inclined. Further, since the holding member 14 is a cylindrical member, it can accommodate the seal bellows 10 extending and contracting by the straight movement of the valve rod 6 inside this.

The two stoppers 18 and 18 are pin-like members fixed to the shaft portion of the valve rod 6 so as to project to the outer circumference of the valve rod 6. When the valve rod 6 moves straight in a direction closing the opening portion 50 shown in FIG. 5, it abuts against an end surface 14d of the holding member 14 and thereby restricts the movement of the valve rod 6. Note that it is also possible not to have the stoppers 18 and 18 directly abut against the end surface 14d of the holding member 14, but form a groove portion for abutment in the end surface 14d of the holding member 14.

Figure 6A:
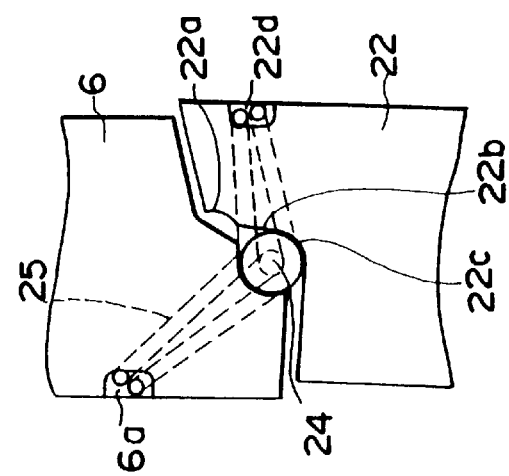
Figure 6B:
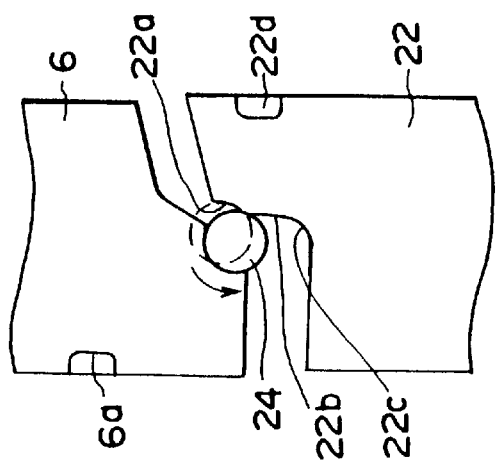
Figure 6C:
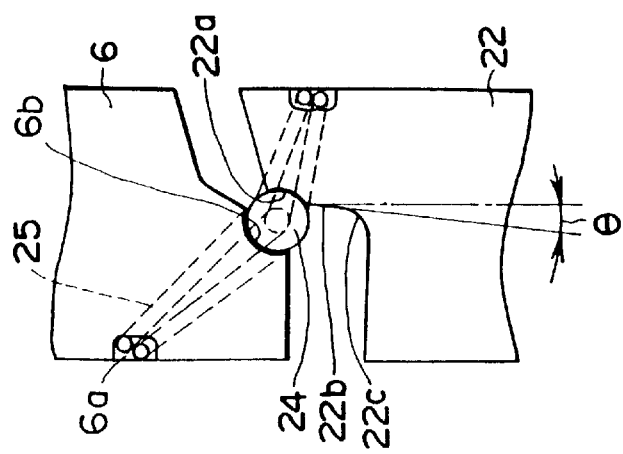

FIGS. 6A to 6C are views showing relative positional relationships between the roller 24 and a roller receiving member 22 illustrated in FIG. 4 and FIG. 5, in which FIG. 6A is a view of a relative positional relationship in a state where the valve body 2 opens the opening portion; FIG. 6B is a view of the relative positional relationship in a state where the valve body 2 closes the opening portion; and FIG. 6C is a view of the relative positional relationship in a state where the valve body 2 seals the opening portion.

The roller 24 is rotatably provided at a predetermined position of the other end portion of the valve rod 6 by a spring member 25. Explaining this more concretely, as shown in FIG. 6A, both end portions of the roller 24 are rotatably supported by the spring member 25 so that part of the outer circumferential surface of the roller 24 is held by a groove-like roller holding portion 6b formed in the end portion of the valve rod 6 so that it can sliding move. One end of the spring member 25 is fixed to the fixing portion 6a formed on the valve rod 6.

The roller receiving member 22 is arranged so as to face the other end portion of the valve rod 6 at which the roller 24 is held. On the front end portion of the roller receiving member 22, a first holding portion 22a capable of holding the roller 24, an inclined surface 22b with which the roller can engage while rotating, and a second holding portion 22c capable of holding the roller 24 are continuously formed.

The first holding portion 22a is formed in a groove-shape and holds the roller 24 when the valve rod 6 moves straight in a direction opening and closing the opening portion 50.

The inclined surface 22b can incline the valve rod 6 about the shaft 14b by engagement with the roller 24. The angle of inclination θ of this inclined surface 22b with respect to the valve rod 6 is set to for example about 5°.

The second holding portion 22c comprises an R-portion having the same curvature as that of the roller 24 and holds the roller 24 when the valve rod 6 is inclined up to a predetermined angle. Note that the roller 24 contacts the first holding portion 22a, the inclined surface 22b, and the second holding portion 22c of the roller receiving member 22, therefore, as the material for forming the roller 24 and the roller receiving member 22, in order to prevent wear, a relatively hard metal material, for example, SUJ2, is desirably used.

The spring member 25 which rotatably supports the roller 24 supports the roller 24. At the same time, the other end is fixed to the fixing portion 22d formed in the roller receiving member 22. By this, it is possible to prevent the relative positions of the end portion of the valve rod 6 and the roller receiving member 22 from deviating and two members not facing each other.

The two end portions of the coil spring 28 are fixed to the fixing portion 26a formed on the fixing member 26 fixed to the valve rod 6 and the fixing portion 30a formed on the connection plate 30 so as to surround the end portion of the valve rod 6 and the outer circumference of the roller receiving member 22 facing each other. The function of the coil spring 28 is to connect the valve rod 6 and the roller receiving member 22 so as to suppress the release of the holding state of the roller 24 from the first holding portion 22a. Namely, when the roller receiving member 22 moves straight in a state holding the roller 24 at the first holding portion 22a, the coil spring 28 functions to prevent easy release of the holding state of the roller 24 of the first holding portion 22a.

Cylinder Apparatus

Figure 7:
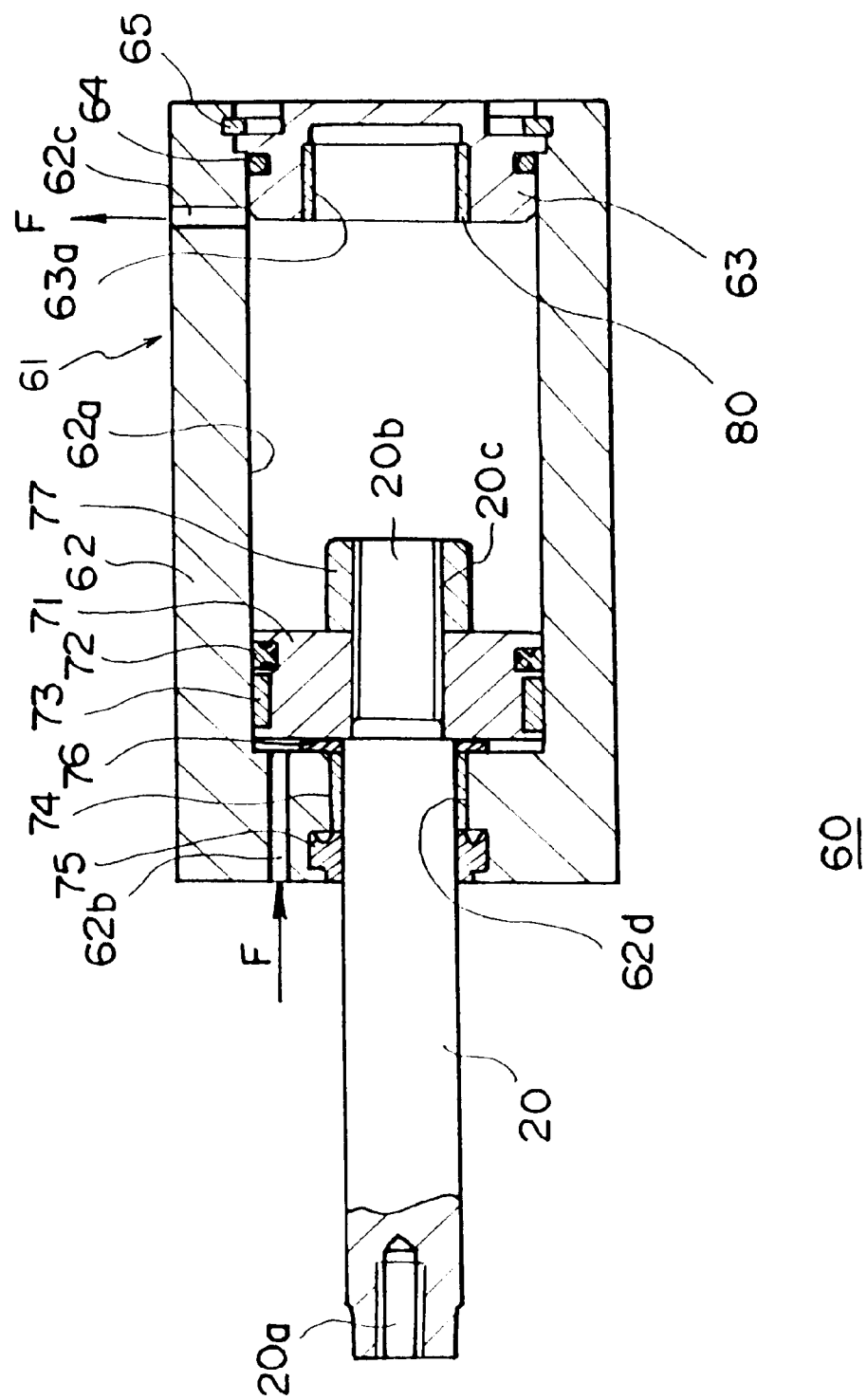
FIG. 7 is a sectional structural view of an air cylinder according to the first embodiment of a cylinder apparatus of the present invention.

FIG. 7 is a view of an example of the sectional structure of the compressed air driving type cylinder apparatus (air cylinder apparatus) 60 according to a first embodiment of the cylinder apparatus of the present invention.

The air cylinder apparatus 60 illustrated in FIG. 7 illustrates a cylinder apparatus driven by compressed air. The air cylinder apparatus 60 is built into for example a cylinder case of the gate valve 1.

As shown in FIG. 7, the air cylinder 60 is basically constituted by the piston rod 20, one end of which is fixed to the connection plate 30, the piston 71 fixed to the other end of the piston rod 20, and a cylinder unit 61 which accommodates the piston 71 in an inner circumferential surface 62a so that it can slide.

The piston rod 20 of the air cylinder 60 is in an operating state completely opening the opening portion 50.

A female screw portion 20a for connection with the connection plate 30 is formed on one shaft portion of the piston rod 20, and a male screw portion 20c for affixing the piston 71 is formed on the other shaft portion 20b.

The piston 71 is screwed to the male screw portion 20c, but the other shaft portion 20b is projected from the front end surface of the piston 71. A bearing collar 77 is screwed to the part of the other shaft portion 20b projected from the front end surface of the piston 71. This acts as the support shaft of the present invention.

The front end portion of the bearing collar 77 is formed to an R-shape having a predetermined curvature. This is for facilitating insertion into the bushing 80 mentioned later.

Cushion rubber 76 is fixed to the shaft portion of the piston rod 20 in contact with the end surface of the piston 71. The cushion rubber 76 is provided so as to prevent an inconvenience such as wear due to direct collision of the piston 71 and the end surface of the cylinder 61.

The material for forming the piston rod 20 is not particularly limited, but preferably a material having a relatively high strength, for example, carbon steel, is used. As the material for forming the bearing collar 77, preferably use is made of a material which has a good intimacy and is excellent in fatigue resistance, abrasion resistance, friction resistance, and drawability, for example, bronze and phosphor bronze.

The piston 71 is screwed into the other shaft portion 20b of the piston rod 20. Further, a piston seal 72 and a wear ring 73 are provided at the outer circumference of the piston 71, a space between this and an inner circumferential surface 62a of the cylinder body 62 is sealed by the piston seal 72, and the abrasion etc. due to the sliding between the piston 71 and the inner circumferential surface 62a of the cylinder body 62 is suppressed by the wear ring 73.

The cylinder unit 61 is constituted by a cylindrical member, that is, the cylinder body 62, and a head cover 63. An insertion hole 62d for inserting the piston rod 20 is formed on one end of the cylinder body 62. A bushing 74 and a rod seal 75 are provided between this insertion hole 62d and the piston rod 20. The bushing 74 prevents abrasion etc. due to the abutment of the insertion hole 62d of the cylinder body 62 and the piston rod 20. the rod seal 75 seals between the insertion hole 62d and the piston rod 20 so that the piston rod 20 can be moved. A flow path 62b for the entry and exit of the compressed air F is formed at one end of the cylinder body 62.

The material for forming the cylinder body 62 is not particularly limited, but preferably a material having a relatively high strength, for example, carbon steel, is used. Also, the material for forming the bushing 74 is not particularly limited, but preferably use is made of a material which is excellent in fatigue resistance, abrasion resistance, friction resistance, and drawability, for example, a copper alloy and bronze.

The head cover 63 is fit and inserted into the opening portion of the other end of the cylinder body 62, and the space between the cylinder body 62 and the head cover 63 is sealed by the O-ring 64. The head cover 63 is fixed to the cylinder body 62 by mounting (inserting) a stopper ring 65 into a groove formed in an inner circumference of the other end portion of the cylinder body 62.

A flow path 62c for entry and exit of the compressed air F for driving the air cylinder apparatus 60 is formed on the other end of the cylinder body 62.

In the head cover 63 is formed a support hole 63a for supporting the other shaft portion 20b of the piston rod 20 on the outer circumference of which the bearing collar 77 is screwed. A bushing 80 is placed in the support hole 63a. The bearing collar 77 can be fit and inserted into this bushing 80.

The material for forming the head cover 63 is not particularly limited, but for example a material similar to the material for forming the cylinder body 62 can be used. As the material for forming the bushing 80, preferably use is made of a material which is excellent in fatigue resistance, abrasion resistance, friction resistance, and drawability, for example, a copper alloy and bronze.

The air cylinder apparatus 60 constituted as described above suitably supplies and discharges the compressed air to and from two flow paths 62b and 62c of the compressed air F formed in the cylinder unit 61, whereby the piston 71 is driven in the straight line direction. As a result, the piston rod 20 moves straight.

The compressed air F is supplied to the flow paths 62b and 62c from the air supply source (not illustrated), for example, an air compressor. The supply of the compressed air F to the flow paths 62b and 62c is selectively switched by a switching valve provided in the air supply source. By a selective switching operation of the switch valve, reciprocal movement of the piston rod 20 is carried out.

Operation of Gate Valve 1

The operation of the gate valve 1 will be explained next by referring to FIG. 8 to FIG. 12.

Figure 8:
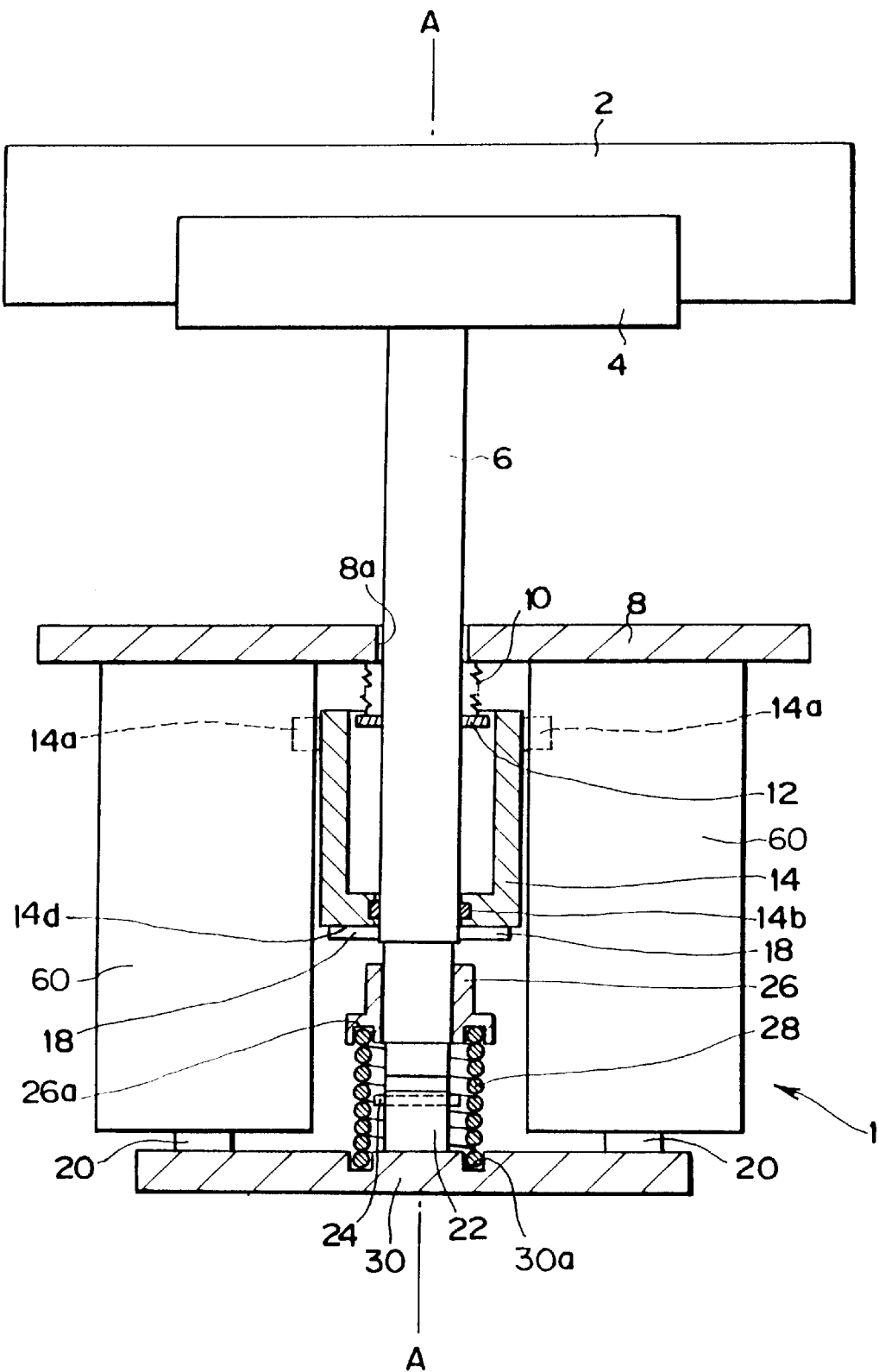
FIG. 8 is a view of a state where the opening portion is closed by the gate valve illustrated in FIG. 4.
Figure 9:
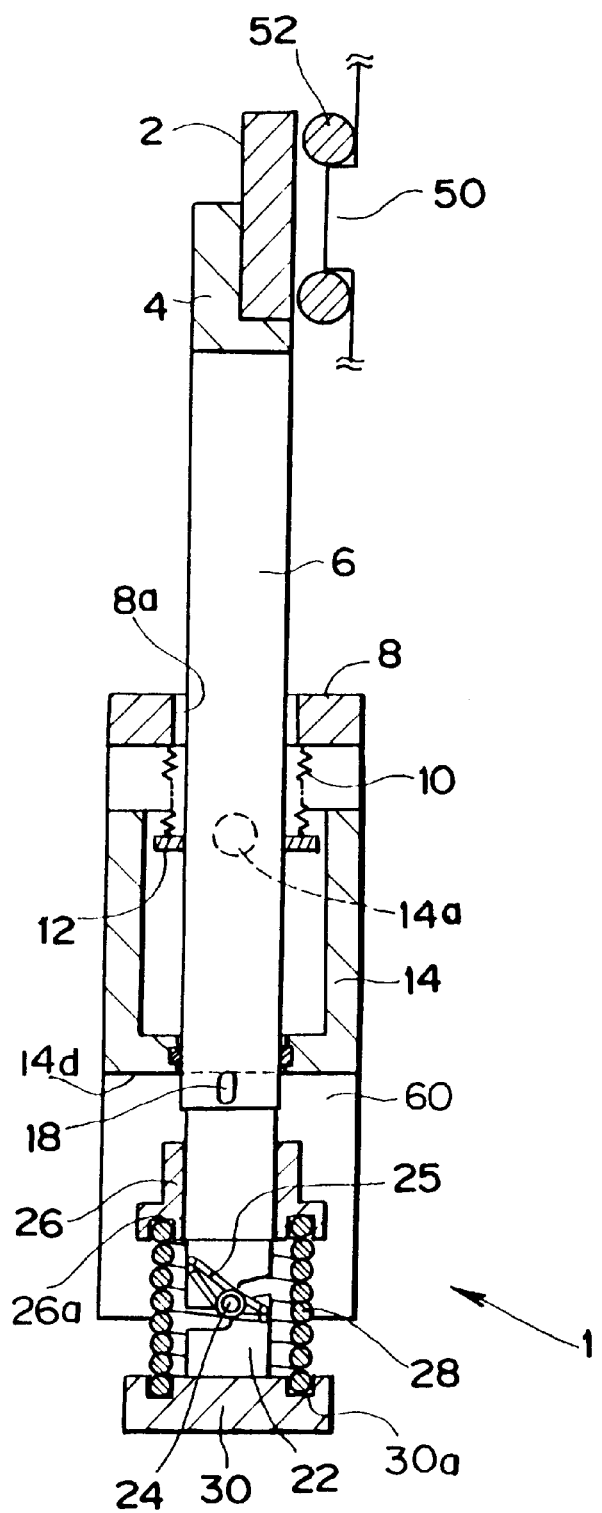
FIG. 9 is a sectional view along the direction of the line A—A in an operating state of the gate valve illustrated in FIG. 8.

FIG. 8 is a sectional view of a state where the opening portion is closed by the gate valve illustrated in FIG. 4. FIG. 9 is a sectional view along the direction of a line A—A in the operating state of the gate valve shown in FIG. 8.

Figure 10:
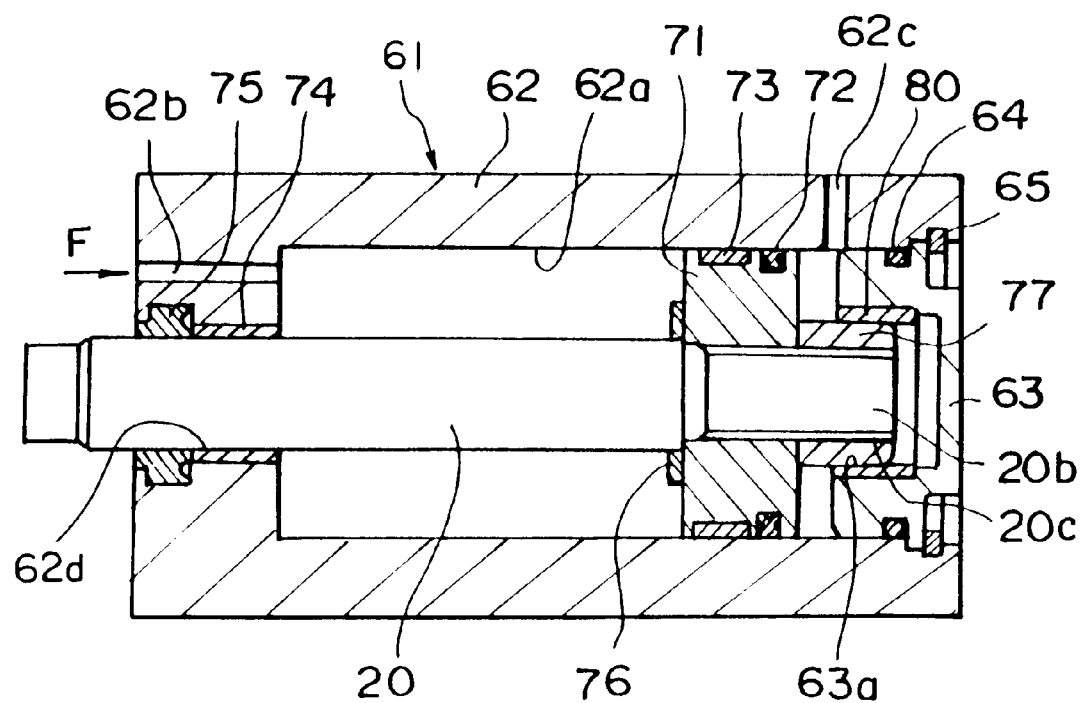
FIG. 10 is a sectional view of a state where part of a bearing collar of the air cylinder illustrated in FIG. 7 is fitted and inserted into a bushing placed in a head cover.

FIG. 10 is a sectional view of a state where one part of the bearing collar of the air cylinder apparatus 60 illustrated in FIG. 7 is fitted and inserted into the bush put in the head cover.

Figure 11:
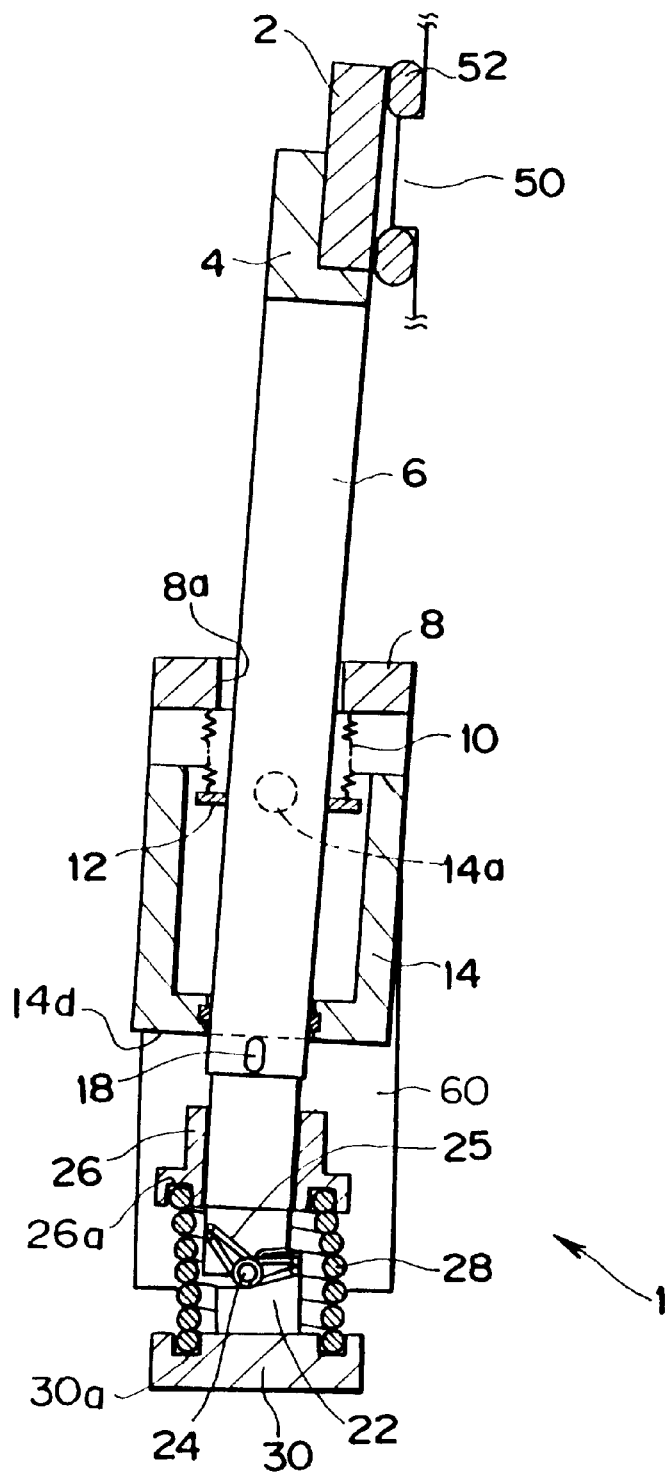
FIG. 11 is a sectional view of a state where the opening portion is closed by the gate valve illustrated in FIG. 7.

FIG. 11 is a sectional view of a state where the opening portion is closed by the gate valve illustrated in FIG. 7.

Figure 12:
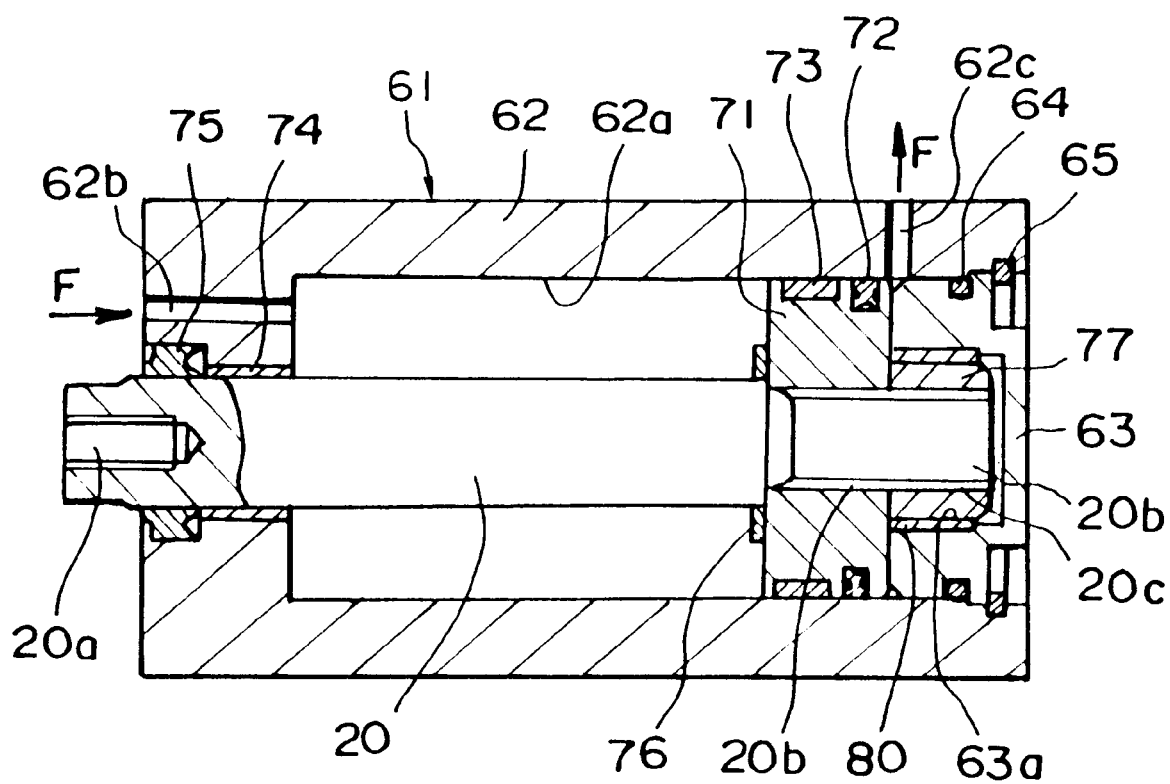
FIG. 12 is a sectional view along the direction of the line A—A in the operating state of the gate valve shown in FIG. 11.

FIG. 12 is a sectional view along the direction of the line A—A in the operating state of the gate valve shown in FIG. 11.

The state of the gate valve 1 shown in FIG. 4 and FIG. 5 is the state where the opening portion 50 is opened. By driving the air cylinder apparatus 60, the roller receiving member 22 is moved straight in a direction closing the opening portion 50.

The straight movement of the roller receiving member 22 in a direction closing the opening portion 50 is achieved by supplying compressed air from the flow path 62b of the compressed air F in the state of the air cylinder apparatus 60 shown in FIG. 7 and discharging the air from the flow path 62c of the compressed air F to the outside portion along with the movement of the piston 71.

By driving the air cylinder apparatus 60, the roller receiving member 22 moves the valve rod 6 straight in the state where the first holding portion 22a holds the roller 24 as shown in FIG. 6A. At this time, when the roller receiving member 22 is moved at a high speed, the state of the first holding portion 22a holding the roller 24 is held and will not be released by the restoration force of the coil spring 28 and the spring member 25. Further, the drive force from the roller receiving member 22 to the roller 24 is transferred from the first holding portion 22a not by frictional force or the like, but directly, therefore the roller receiving member 22 can be moved at a high speed.

When the roller receiving member 22 moves and the valve rod 6 reaches a predetermined position, as illustrated in FIG. 8 and FIG. 9, the stopper 18 abuts against the end surface 14d of the holding member 14, the movement of the valve rod 6 is limited, and a state where the valve body 2 closes the opening portion 50 is exhibited. At this time, the air cylinder apparatus 60 is in a state where part of the bearing collar 77 is fitted and inserted into the bushing 80 put in the support hole 63a of the head cover 63 of the cylinder unit 61 shown in FIG. 10.

When the piston 71 moves further in the direction of the bushing 80 from the state of the air cylinder apparatus 60 shown in FIG. 10 and the roller receiving member 22 moves straight, the valve rod 6 does not move, only the roller receiving member 22 moves. As shown in FIG. 6B, the state where the roller 24 is held at the first holding portion 22a is released. The roller 24 rolls on the inclined surface 22b while rotating in the direction of the arrow shown in FIG. 6B. By this, the valve rod 6 is inclined about the shaft 14a of the holding member 14. At this time, the roller 24 does not slide with respect to the roller receiving member 22, but rolls, therefore the occurrence of abrasion between the roller 24 and the roller receiving member 22 is suppressed as much as possible.

When the roller 24 rolls on the inclined surface 22b of the roller receiving member 22, the valve rod 6 is inclined, and as shown in FIG. 11, the valve body 2 presses against the O-ring 52 provided on the outer circumference of the opening portion 50 and crushes it. At this time, the force of straight movement of the roller receiving member 22 due to the air cylinder apparatus 60 is amplified by the wedge effect of the inclined surface 22b, and the force of the valve body 2 pressing against the O-ring 52 becomes a predetermined multiple of the straight movement force, for example about 10 times. By this, the valve body 2 can sufficiently press against the O-ring 52, and the sealing of the opening portion 50 is carried out well.

As shown in FIG. 6C, the spring member 25 resiliently deforms against its restoration force. As shown in FIG. 11, the coil spring 28 similarly resiliently deforms.

On the other hand, when the valve rod 6 starts inclining about the shaft 14a of the holding member, a moment acts upon the roller receiving member 22 from the valve rod 6 as a reaction force. Namely, a moment increasing in accordance with the angle of inclination θ of the valve rod 6 acts upon the roller receiving member 22. This moment acts upon the piston rod 20 through the connection plate 30 from the roller receiving member 22. In the present embodiment, the moment acting upon the piston rod 20 increases in accordance with the angle of inclination θ of the valve rod 6. In order to seal the opening portion 50 well, a large moment of for example several tens of kgf·m acts.

In the air cylinder apparatus 60 of the present embodiment, at the time of start of inclination of the valve rod 6, that is, at the time when a moment is applied to the piston rod 20, as described above, the bearing collar 77 screwed into the other shaft portion 20b of the piston rod 20 is fit and inserted into the bushing 80 placed in the support hole 63a formed in the head cover 63 of the cylindrical cylinder unit 61. Accordingly, the other shaft portion 20b of the piston rod 20 is supported by the support hole 63a via the bushing 80, therefore even if a large moment is applied to the piston rod 20, the piston rod 20 is not inclined, but strongly supported. For this reason, the abrasion and fatigue of the constituent parts of the air cylinder apparatus 60 can be prevented, and the durability of the air cylinder apparatus 60 can be improved.

Further, when the bearing collar 77 and the bushing 80 abrade when these members abut, it is sufficient to replace these members, so maintenance becomes very easy.

Further, since the piston rod 20 is not inclined but strongly supported, a sufficient force required for inclination of the valve rod 6 can be generated.

By further straight movement of the roller receiving member 22, when the valve rod 6 is inclined by a predetermined angle, as shown in FIG. 6C, the roller 24 is held by the second holding portion 22c of the roller receiving member 22. By this, the sealing operation of the opening portion 50 by the valve body is completed. By the holding of the roller 24 by the second holding portion 22c, the roller 24 does not move, and the sealed state of the opening portion 50 can be stably held. At this time, the air cylinder apparatus 60 is in a state where the front end surface of the piston 71 abuts against the end surface of the head cover 63, and the bearing collar 77 is completely fit and inserted into the bushing 80 as shown in FIG. 11.

The operation of opening the opening portion 50 is achieved by supplying compressed air from the flow path 62c of the compressed air F of the cylinder unit 61 from the state of the air cylinder apparatus 60 shown in FIG. 12 and discharging it from the flow path 62b, thereby moving the roller receiving member 22 straight in the direction opening the opening portion 50. At this time, the roller 24 rolls on the inclined surface 22b from the state where it is held by the second holding portion 22c due to the restoration force of the spring member 25 and the coil spring and held at the first holding portion again, whereby the valve rod 6 stands straight.

As described above, according to the gate valve 1 of the present embodiment, the valve rod 6 can be moved straight in the state where the roller 24 is held by the first holding portion 22a of the roller receiving member 22, therefore the valve rod 6 can be reliably moved straight, and the reliability of operation is high. Further, the gate valve 1 of the present embodiment makes high speed movement of the valve rod 6 possible. As a result, the speed of the opening and closing operation of the opening portion 50 can be raised by the valve body 2. When the gate valve 1 of the embodiment of the present invention is made to operate by using the air cylinder apparatus 60, the effect is particularly great as explained above.

Further, according to the gate valve of the present embodiment, since the first holding portion 22a, the inclined surface 22b, and the second holding portion 22c of the roller receiving member 22 are continuously formed, the shift from the straight movement to inclination of the valve rod 6 is smooth.

Further, according to the gate valve of the present embodiment, since the roller 24 moves while rolling on the first holding portion 22a, the inclined surface 22b, and the second holding portion 22c of the roller receiving member 22, there is no sliding friction, generation of particles due to abrasion can be suppressed as much as possible, and shortening of the service life of the gate valve due to abrasion can be prevented.

Further, according to the gate valve of the present embodiment, since the straight movement and inclination of the valve rod 6 can be carried out by the roller receiving member 22 moved straight by the piston cylinder via the roller 24, the structure of the gate valve 1 is very simplified.

The air cylinder apparatus 60 explained in relation to the driving of the gate valve 1 is durable against the moment acting upon the piston rod 20. In addition, since the support structure of the air cylinder apparatus 60 is simple, the air cylinder apparatus 60 can be produced at low cost.

Note that the application of the air cylinder apparatus 60 is not limited to only the gate valve 1. Other than the gate valve 1, it can also be applied to another valve body or driven object (actuator) requiring straight movement and inclination of the valve body. Namely, even if this is applied to such an actuator, by applying the air cylinder apparatus 60 to an actuator by which a large moment repeatedly acts upon the piston rod 20, a large moment can be supported. Further, the durability of the air cylinder apparatus 60 of the present embodiment is improved.

Further, when the cylinder apparatus of the present embodiment is used for the gate valve 1 or a purpose other than gate valve 1, the drive source of the cylinder apparatus is not limited to compressed air. Various media for driving a cylinder apparatus such as a fluid can be used.

Second Embodiment

A second embodiment of the present invention will be explained next by referring to FIG. 13 to FIG. 14.

Figure 13:
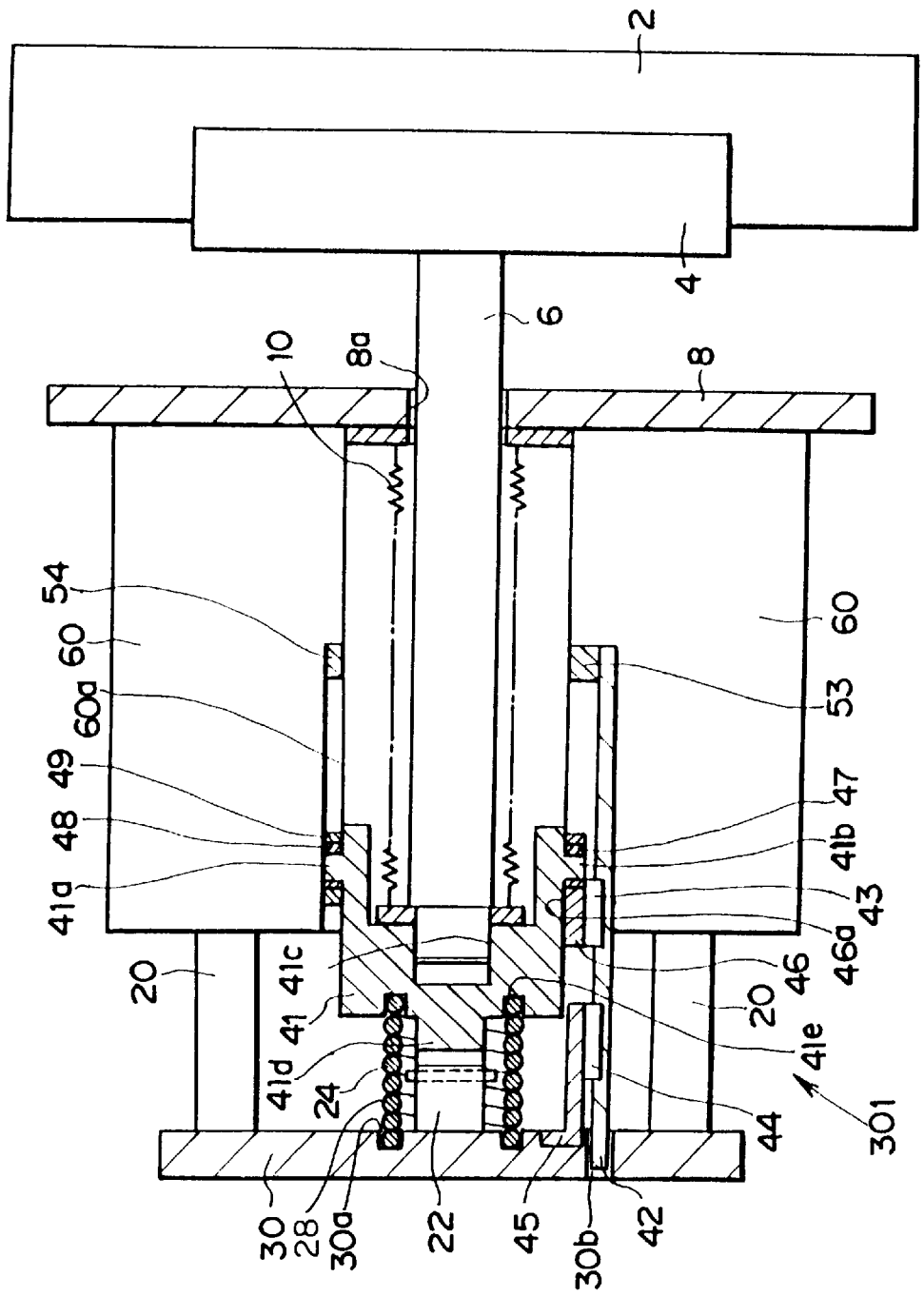
FIG. 13 is a sectional view of the gate valve according to a second embodiment of the present invention.

FIG. 13 is a sectional view of the gate valve according to a second embodiment of the present invention.

Usually, in the manufacturing process of a liquid crystal panel, the multi-chamber structure of the vacuum process apparatus illustrated in FIG. 1 is used. When the liquid crystal panel is held in a horizontal state and transported in the multi-chamber, the glass plate constituting the liquid crystal panel bends, which sometimes becomes inconvenient in the manufacture of a liquid crystal panel. In order to prevent this bending, for example, a method of transporting the liquid crystal panel in the multi-chamber structure by holding this in the vertical direction has been known.

When the liquid crystal panel is held in a vertical direction and transported in the multi-chamber structure, the gate in the multi-chamber structure of the vacuum process apparatus must be vertically long. The gate valve for opening, closing, and sealing such a vertically long gate is arranged in the horizontal direction and must drive the valve body 2 in the horizontal direction.

A gate valve 301 shown in FIG. 13 is a gate valve suited for opening, closing, and sealing the vertically long gate as described above. Namely, the gate valve 301 illustrated in FIG. 13 is a gate valve arranged in the horizontal direction and suited for driving the valve body 2 in the horizontal direction.

Details of the gate valve 301 illustrated in FIG. 13 will be explained next. In the gate valve 1 of the first embodiment and the gate valve 301 of the second embodiment, the same constituent parts are indicated by the same reference numerals.

In FIG. 13, the horizontally arranged gate valve 301 is basically constituted by the valve body 2, valve rod 6, attachment member 8, seal bellows 10, air cylinder apparatus 60, a housing member 41 to which the lower end portion of the valve rod 6 is fixed and which holds the valve rod 6 so that it can freely move straightly and incline, a roller 24 rotatably provided at the lower end portion of the housing member 41, a roller receiving member 22 arranged facing the lower end portion of the housing member 41, a connection plate 30 connecting the roller receiving member 22 and the piston rod 20, a coil spring 28 connecting the lower end portion of the housing member 41 and the connection plate 30, a first movement block 43 and a second movement block 44 respectively holding the housing member 41 and the connection plate 30, and a rail 42 on which the first and second movement blocks 43 and 44 are moveably provided and which is provided on the side surface of the lower part of the air cylinder apparatus 60. The other constituent members will be explained later.

In the housing member 41 is formed an insertion hole 41c into which the lower end portion of the valve rod 6 is inserted and fixed. The lower end portion 41d holds the roller 24 and has a similar structure to that of the end portion of the valve rod 6 shown in FIG. 6A to FIG. 6C. A fixed portion 41e is formed at the bottom portion of the housing member 41. The coil spring 28 is arranged so as to surround the lower end portion of the housing member 41 and the outer circumference of the roller receiving member 22. Both end portions of the coil spring 28 are fixed to the fixing portion 30a formed on the connection plate 30.

Shaft portions 41a and 41b are formed on the side portions of the housing member 41. The shaft portion 41b is rotatably held by the movement member 49 via a bearing 48.

The movement member 49 can freely move in the groove portion 60a formed along the straight movement direction at the side portion of the upper part of the air cylinder 60. The shaft portion 41b of the housing member 41 is rotatably held by the sliding member 46 via the bearing 47.

By this, the housing member 41 can incline, and the valve rod 6 will incline by the inclination of the housing member 41.

The sliding member 46 abuts against the side surface of the housing member 41 so as to hold the side surface of the housing member 41. On the sliding surface 46a of the sliding member 46, the side surface of the housing member 41 slides when the housing member 41 inclines about the shaft portions 41a and 41b.

The angle of inclination of the housing member is for example about one degree. The sliding distance between the side surface of the housing member 41 and the sliding surface 46a of the sliding member 46 is 2 to 3 mm at a maximum.

The sliding member 46 is fixed to the first movement block 43 by a fastening means, for example, a bolt. The load of the housing member 41, piston rod (valve rod) 6, valve body 2, etc. rotatably held at the sliding member 46 will be applied to the top of the first movement block 43.

In the sliding member 46, a member having a lubrication function and low abrasion property is used for the sliding surface 46a. As the material for forming the sliding member 46, for example, use can be made of a metal member in which a solid lubricant is embedded or a metal member with PTFE (polytetrafluoroethylene) in which a lubricating material is mixed.

The first movement block 43 is held on the side surface of the air cylinder 60 so that it can move on one rail 42 fixed along the direction of straight movement by a not illustrated bearing mechanism.

On the rail 42, the second movement block 44 is moveably held by a not illustrated bearing mechanism. The second movement block 44 can move on the rail 42 independently from the first movement block 43.

On the second movement block 44, an L-shaped member 45 is fixed by a fastening means, for example, a bolt. This L-shaped member 45 is fixed to the connection plate 30 by a fastening means such as a bolt. By this, the second movement block 44 and the connection plate 30 are connected, and the load of the connection plate 30 and the member connected to this will be applied on the second movement block 44.

Operation of Gate Valve 301

The operation of the gate valve 301 illustrated in FIG. 13 will be explained next.

The inclination operation of the gate valve 301 is similar to that of the gate valve 1 of the first embodiment.

When the air cylinder apparatus 60 is driven from the state shown in FIG. 13, the first movement block 43 supporting the load of the valve body 2, valve rod 6, housing member 41, etc. and the second movement block 44 supporting the load applied from the connection plate 30 etc. move on the rail 42.

Figure 14:
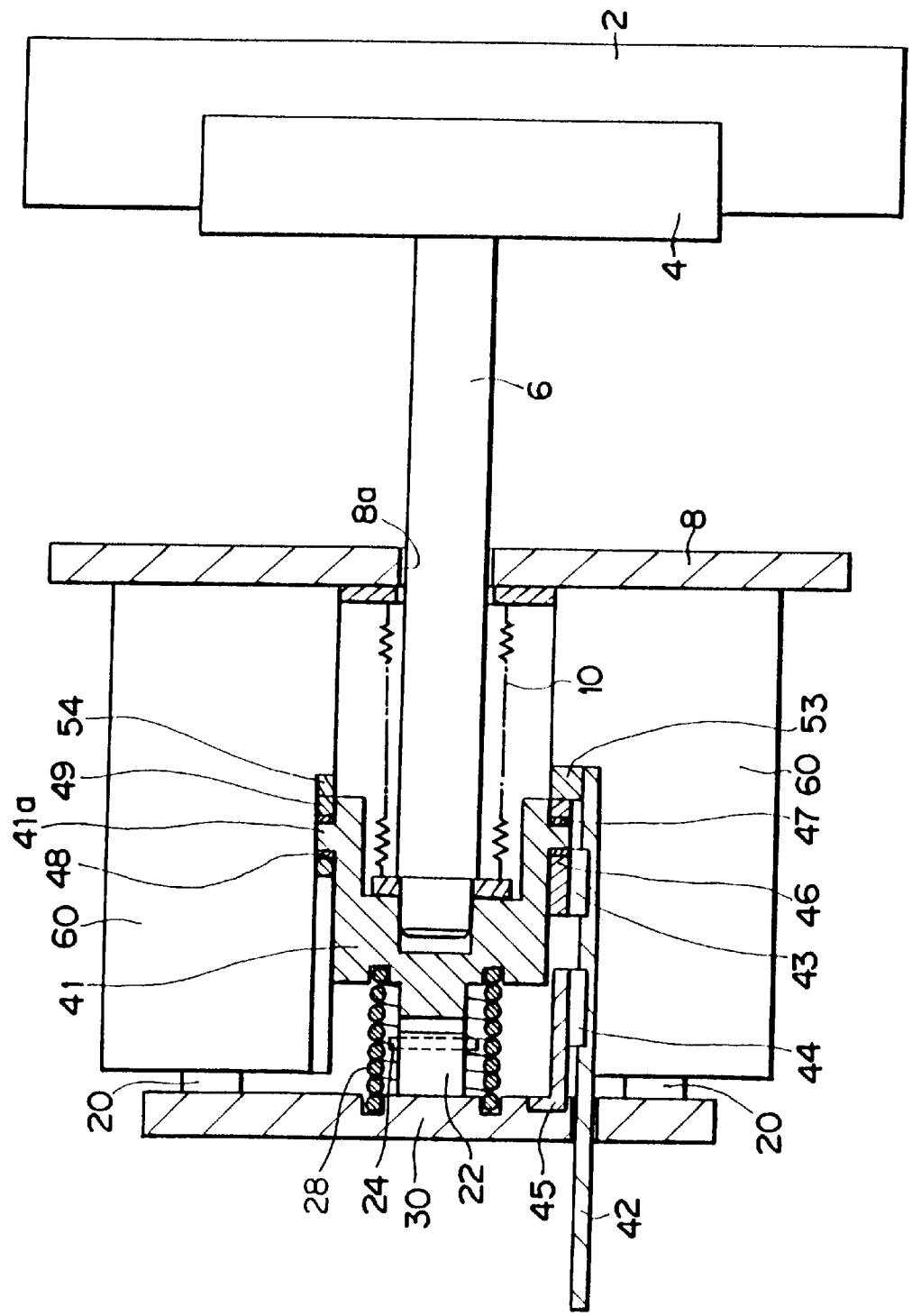
FIG. 14 is a sectional view of a state where the opening portion is closed by the gate valve shown in FIG. 13.

When the valve body 2 reaches the position closing the gate, as shown in FIG. 14, the movement member 49 and one end surface of the sliding member 46 abut against the stoppers 48 and 53 provided at predetermined positions of the side portion of the air cylinder apparatus 60, respectively. By this, the movement of the housing member 41 stops.

Further, by driving the air cylinder apparatus 60, only the second movement block 44 moves. By a similar function to that explained in the first embodiment, the housing member 41 is pressed by the roller receiving member 22 via the roller 24 and inclines about the shaft portions 41a and 41b.

When the housing member 41 inclines, the side surface of the housing member 41 slides with respect to the sliding surface 46a of the sliding member 46. At this time, the sliding surface 46a of the sliding member 46 has a lubrication function as described above, therefore the side surface of the housing member 41 smoothly moves with respect to the sliding surface 46a of the sliding member 46. For this reason, the inclination of the valve rod 6 is smoothly carried out.

A considerably large load is applied to the sliding surface 46a of the sliding member 46 through the housing member 41, but since as described above, a member having a low abrasion property is used for the sliding surface 46a of the sliding member 46, even if the side surface of the housing member 41 repeatedly slides, the abrasion can be suppressed as much as possible, and the durability is improved.

As described above, according to the gate valve 301 of the second embodiment, in addition to the effect exhibited by the gate valve 1 of the first embodiment, where it is used by arranging this in the horizontal direction, the opening and closing operation and inclination operation of the valve body 2 can be smoothly carried out.

Further, according to the present invention, the housing member 41 is held by the sliding member 46 so that it can incline, the abrasion produced at the time of inclination can be suppressed as much as possible, and a horizontally arranged type gate valve having an improved durability can be obtained.

Further, in the second embodiment, since moveable parts such as the connection plate 30 and valve rod 6 can be supported by the first and second movement blocks 43 and 44 independently moveably arranged on one rail 42, the gate valve can be made compact.

Third Embodiment

The gate valve and cylinder apparatus of a third embodiment of the present invention will be explained next referring to FIG. 15 to FIG. 18.

Figure 15:
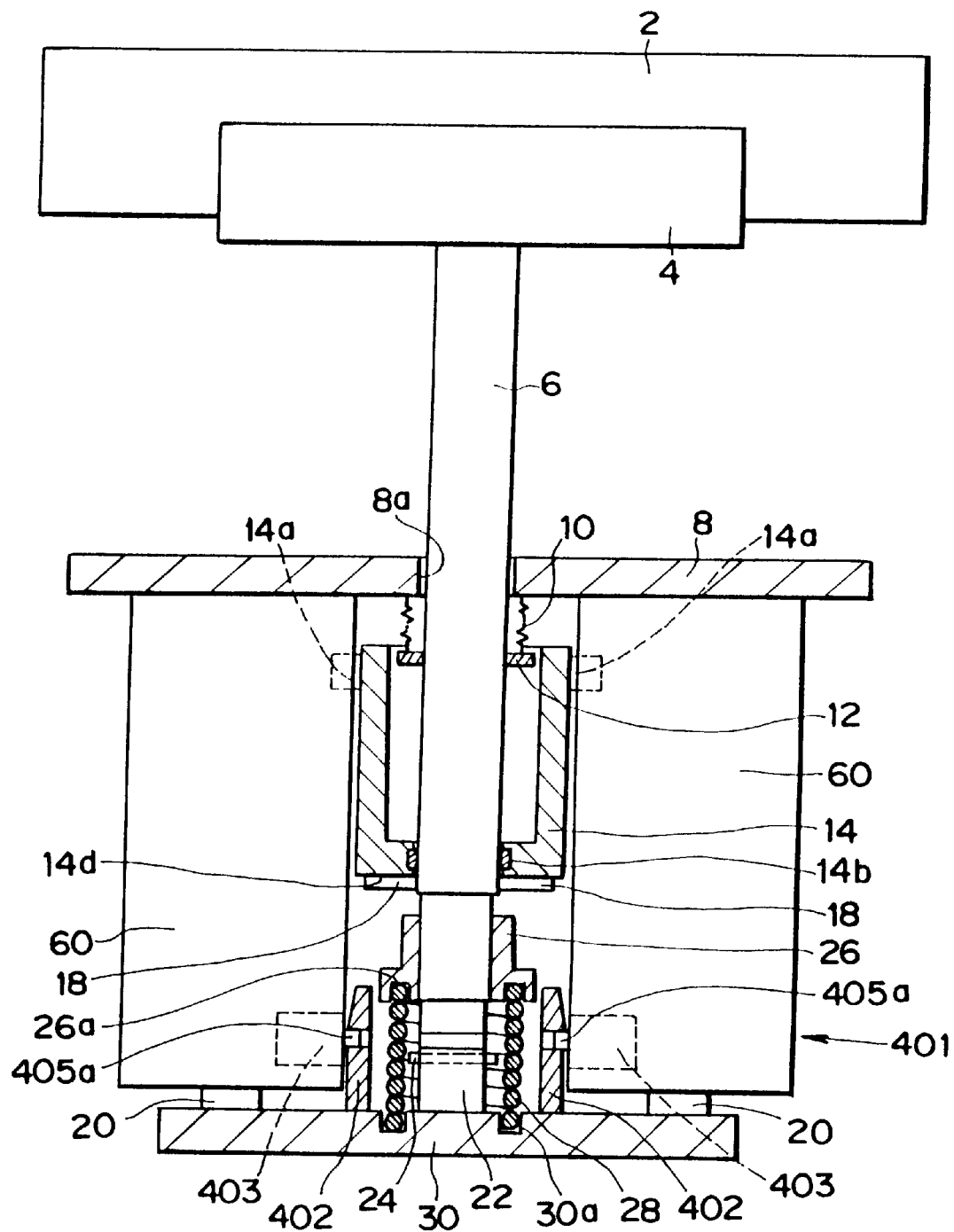
FIG. 15 is a sectional view of the gate valve according to a third embodiment of the present invention.

FIG. 15 is a sectional view of the gate valve according to a third embodiment of the present invention.

Figure 16:
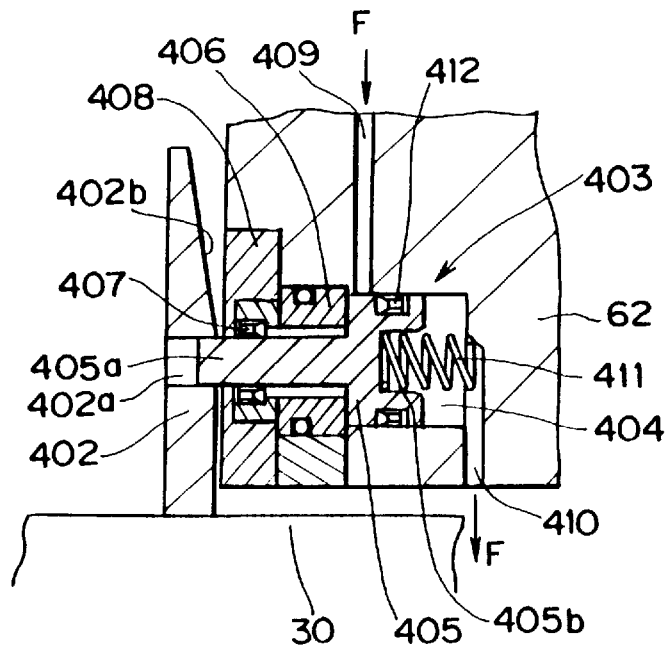
FIG. 16 to FIG. 18 are views of the structure of a lock mechanism according to a third embodiment and the state thereof, where
Figure 17:
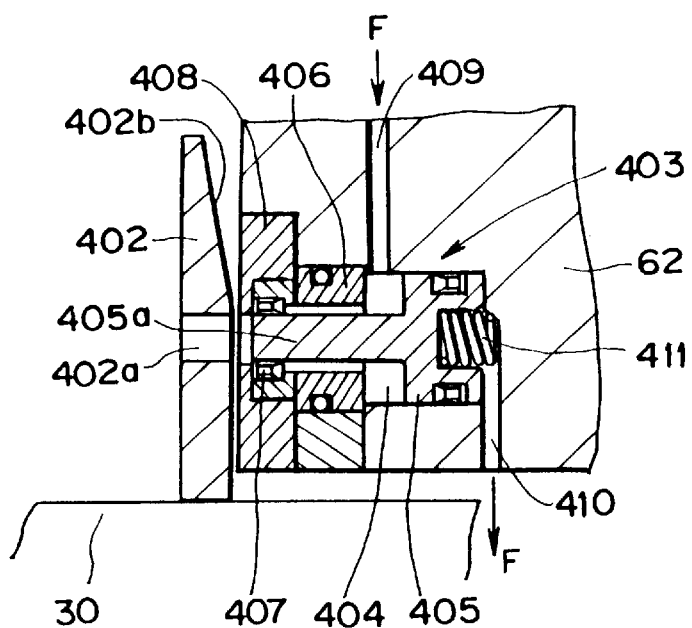
Figure 18:
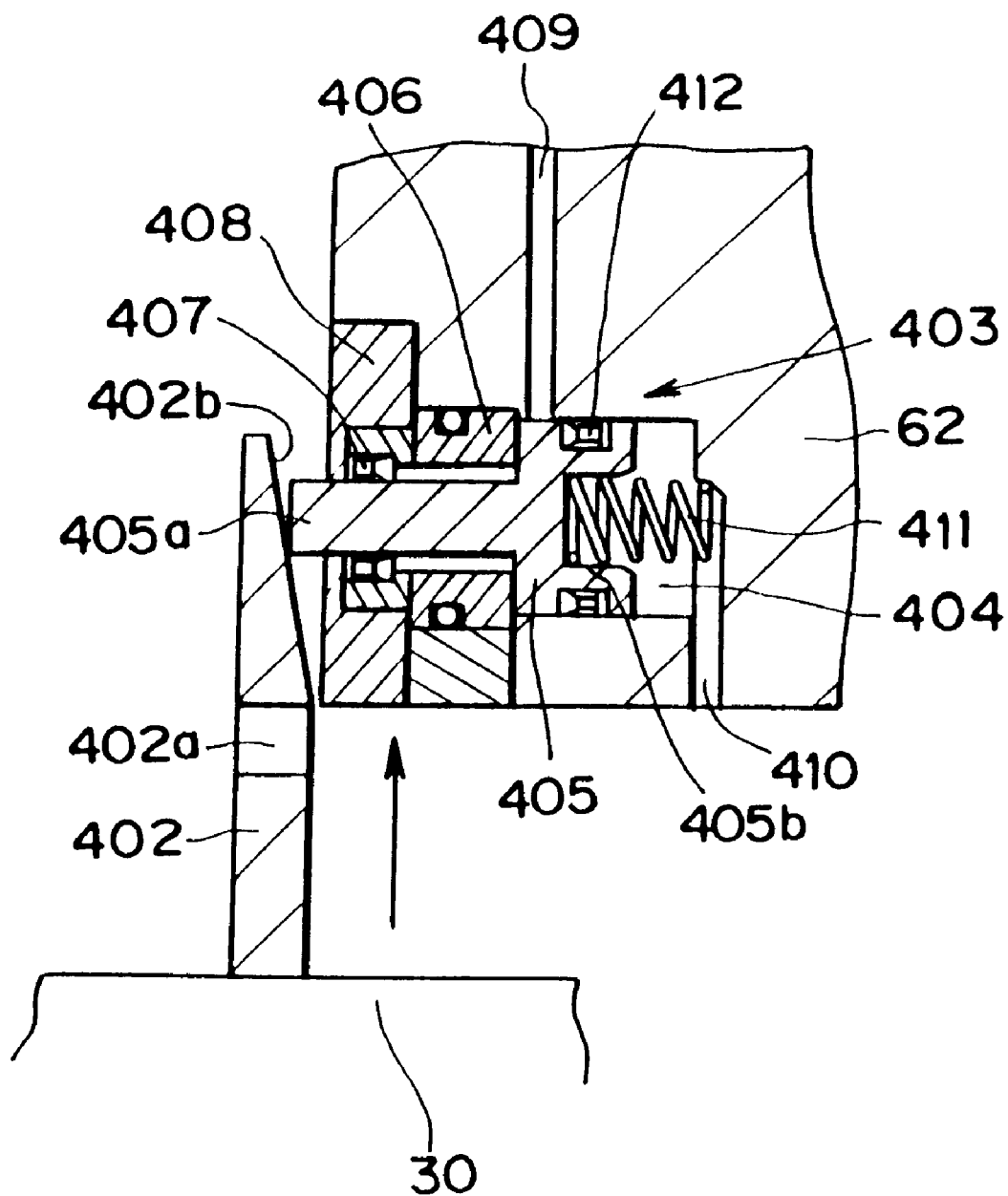

FIG. 16 to FIG. 18 are views showing the structure of the lock mechanism in the third embodiment and the state thereof, in which FIG. 17 is a sectional view of a state where the lock by the lock mechanism is released, and FIG. 18 is a sectional view of a state where the lock pin and the inclined guide surface of the lock use plate abut against each other.

As the functions of the gate valve, in addition to the opening, closing, and sealing of the opening portion (gate) of the sealed chamber, a lock mechanism capable of holding the sealed chamber in the sealed state by the valve body even if the drive force driving the valve body is not supplied is required. The reason for this is that there are cases where the vacuum state of the sealed chamber by the valve body has to be held even when the drive source for driving the valve body breaks down during the use of the gate valve or when the drive force cannot be supplied from the drive source at the time of transport etc. in the chamber.

The gate valve 401 of the third embodiment has a lock mechanism capable of holding the vacuum state of the sealed chamber by the valve body even when the drive source for driving the valve body breaks down and even at the time of transport etc. in the chamber.

The gate valve 401 shown in FIG. 15 has the same structure as that of the gate valve 1 of the first embodiment except it has the lock mechanism described above.

In FIG. 15, the connection plate 30 is provided with two lock plates 402 and 402 at positions in proximity to the two air cylinder apparatuses 60 in a direction along the direction of movement of the connection plate 30.

The cylinder block 62 of the air cylinder apparatus 60 includes a built-in lock use cylinder portion 403 corresponding to the lock plates 402 and 402. The lock mechanism capable of holding the vacuum state of the sealed chamber by the valve body is constituted by the lock plate 402 and the lock cylinder portion 403.

One example of the lock mechanism of the third embodiment is shown in FIG. 16.

As shown in FIG. 16, the lock plate 402 is vertically provided on the connection plate 30. In this lock plate 402, an inclined guide surface 402b is formed on one surface. A lock hole 402a in which the lock pin of the lock piston mentioned later is fit is formed at a position adjoining this inclined guide surface 402b.

The inclined guide surface 402b is formed so as to abut against the lock pin of the lock piston mentioned later and fit the lock pin in the lock hole 402a. The angle of inclination of the inclined guide surface 402b must be within 30 degrees and is preferably set to 10 to 15 degrees.

The lock hole 402a is formed at a position aligned with the lock pin of the lock piston in a state where the valve body 2 seals the opening portion of the sealed chamber.

At a predetermined position not interfering with the inner circumferential surface 62a of the cylinder body (cylinder block) 62, a considerably smaller cylinder chamber 404 compared with the cylinder of the air cylinder apparatus 60 is formed, the lock piston 405 is moveably accommodated inside the cylinder chamber 404, and the cylinder chamber 404 is blocked by the cover member 408.

The cylinder block 62 shown in FIG. 16 is the cylinder body (cylinder block) 62 of the air cylinder apparatus 60 shown in FIG. 7.

On the outer circumference of the lock piston 405, a sealing member 412 for sealing with the cylinder chamber 404 is provided. A lock pin 405a is formed on one end of the lock piston 405, and a receiver portion 405b for receiving the spring member 411 is formed on the other end.

In the cylinder chamber 404, a limit member 406 for limiting the amount of movement of the lock piston 405 is provided. By the abutment of the lock piston 405 against the limit member 406, movement of the lock piston 405 is limited.

On the outer circumference of the lock pin 405a of the lock piston 405, a sealing member 407 for sealing the cylinder chamber 404 is provided. At the same time, the front end portion of the lock pin 405a can be projected to the outside through a through hole formed in the cover member 408. In the state shown in FIG. 16, the lock pin 405a is projected to the outside and fit in the lock hole 402b of the lock plate.

In the cylinder block 62, a supply port 409 for supplying compressed air F to the cylinder chamber 404 is formed. When the compressed air F is supplied from the supply port 409, the lock piston 405 moves in the direction in which the lock pin 405a is pushed into the cylinder chamber 404 against the spring biasing force by the spring member 411.

The supply port 409 is communicated with the flow path 62c of the air cylinder apparatus 60 illustrated in FIG. 7.

The reciprocating operation of the piston rod 20 of the air cylinder apparatus 60 is realized by selectively supplying the compressed air F to the flow paths 62b and 62c of the air cylinder apparatus 60. When the compressed air F is supplied from the flow path 62c to the internal portion of the cylinder unit 61 of the air cylinder apparatus 60, the valve body 2 is driven in a direction opening the opening portion. Accordingly, when operating the switching valve for selectively switching the supply of the compressed air F to the flow paths 62b and 62c of the air cylinder apparatus 60 from the air supply source and supplying the air to the flow path 62c for driving the valve body 2 in the direction opening the opening portion, the compressed air F is simultaneously supplied from the supply port 409 to the cylinder chamber 404.

In the cylinder block 62, a ventilation hole 410 for connecting the cylinder chamber 404 and the outside of the cylinder block 62 is formed. When the lock piston 405 moves in the direction in which the lock pin 405a is pushed to the internal portion of the cylinder chamber 404, the air in the cylinder chamber 404 is compressed by the lock piston 405 and discharged to the outside from the ventilation hole 410.

An example of the operation of the lock mechanism constituted as described above will be explained next.

Figure 19:
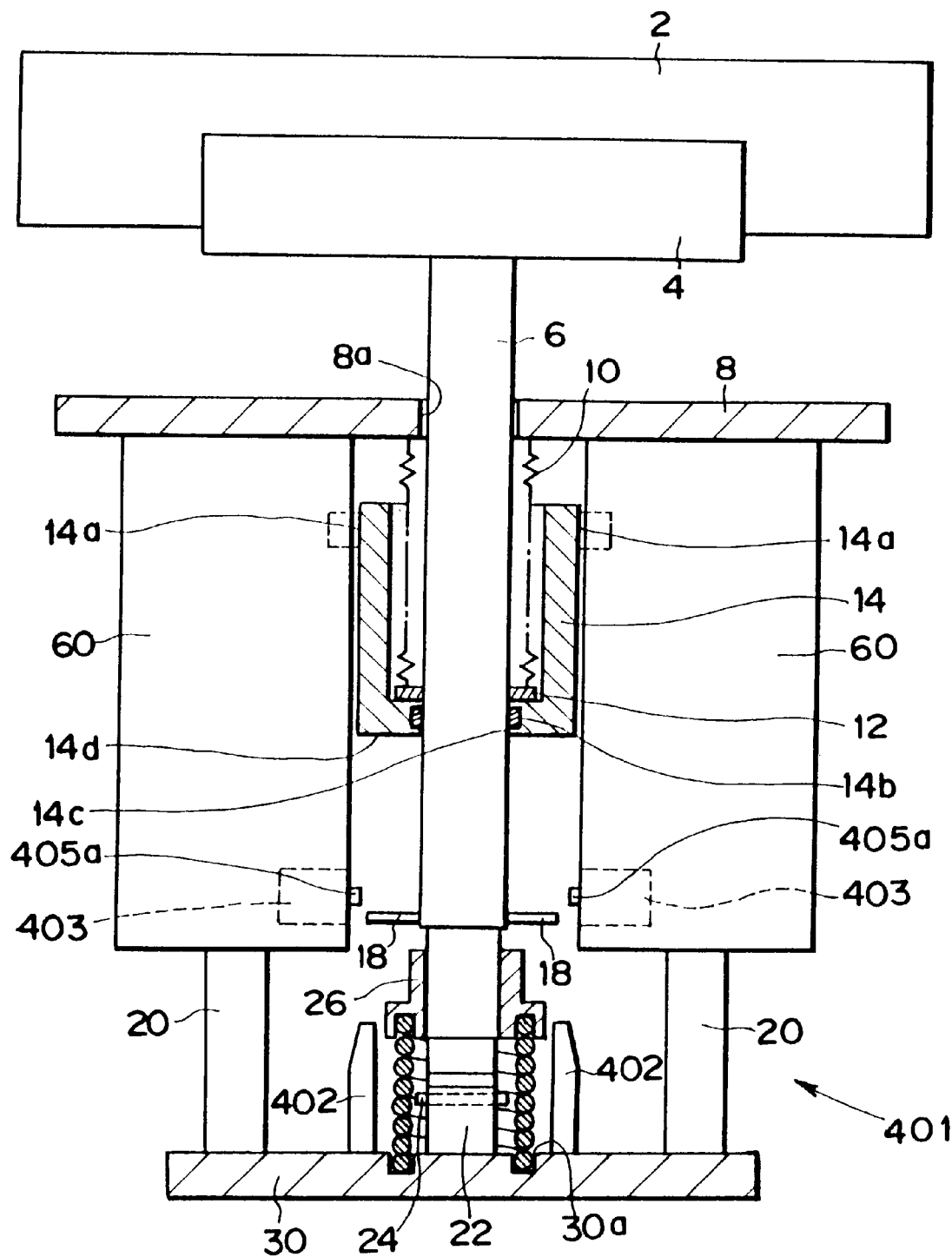
FIG. 19 is a sectional view of an opening state of the gate valve.

FIG. 19 is a sectional view of the opened state of the gate valve.

As shown in FIG. 19, the air cylinder apparatus 60 is driven from the opened state of the valve body 2 of the gate valve 401 and brought to the closed state. In the state shown in FIG. 19, the look pin 405a is biased by the spring member 411 and part is projected from the side surface of the air cylinder apparatus 60.

By the driving of the air cylinder apparatus 60, the connection plate 30 moves in a direction in which the projected lock pin 405a and the lock plate 402 approach each other. As shown in FIG. 18, the front end portion of the lock pin 405a abuts against the inclined guide surface 402b of the lock use plate 402.

When the connection plate 30 further continues moving in the arrow direction from the state shown in FIG. 18, the lock pin 405a is pushed to an inward direction of the cylinder chamber 404 against the biasing force of the spring member 411. When the lock hole 402b of the lock plate reaches a position facing the lock pin 405a, the lock pin 405a is projected again and the lock pin 405a is fit in the lock hole 402b. This state is the state shown in FIG. 16.

On the other hand, simultaneously with the fitting of the lock pin 405a in the lock hole 402b, the opening portion of the sealed chamber is sealed by the valve body 2.

By the fitting of the lock pin 405a with the lock hole 402b, the movement of the connection plate 30 is limited, and the valve body 2 can hold the state where the opening portion of the sealed chamber is sealed. For this reason, even if the compressed air F is no longer supplied to the flow path 62b of the air cylinder apparatus 60, the valve body 2 can hold the state where the opening portion of the sealed chamber is sealed.

An explanation will be made next of the operation for releasing the lock state shown in FIG. 19.

In this case, the switching valve of the air supply source is switched so that the valve body 2 opens the opening portion and the compressed air F is supplied to the flow path 62c of the air cylinder apparatus 60. When the compressed air F is supplied to the flow path 62c of the air cylinder apparatus 60, simultaneously the compressed air F is supplied to also a supply port 409 for supplying the compressed air F to the cylinder chamber 404. When the compressed air F is supplied to the supply port 409, the lock piston 40 moves to the one surface position of the cylinder chamber 404 while compressing the spring member 411 against the biasing force of the spring member 411 as shown in FIG. 17, and the lock pin 405a is pushed into the cylinder chamber 404. By this, the fitting of the lock pin 405a and the lock use hole 402a is released and the connection plate 30 to which the lock plate 402 is fixed becomes able to move, the sealed state of the opening portion by the valve body 2 is released, and the opening portion becomes opened.

When the compressed air F is supplied to also the supply port 409 and the piston 71 starts moving simultaneously with the movement of the lock piston 405, the engagement between the lock pin 405a and the lock hole 402a might conceivably no longer be released well. However, in the gate valve 401 of the third embodiment, there is a certain time lag from the start of movement of the lock piston 405 to when the piston 71 of the air cylinder apparatus 60 starts moving. For this reason, the engagement between the lock pin 405a and the lock hole 402a is released during the time lag to when the piston 71 of the air cylinder apparatus 60 starts moving.

At the time of switching of the switching valve of the air supply source, the air cylinder apparatus 60 is in the state shown in FIG. 12. In FIG. 12, there is high pressure compressed air F in the space on the piston rod 71 side in the cylinder unit 61 at the time of switching the switching valve of the air supply source. A considerably large sliding resistance exists between the piston 71 and the inner circumferential surface 62a of the cylinder unit 61. Further, the inertia of the piston 71 is sufficiently larger between the inertia of the lock piston 405 and the inertia of the piston 71. For this reason, even if the compressed air F is simultaneously supplied to the flow path 62c of the air cylinder apparatus 60 and the supply port 409 by the switching of the switching valve of the air supply source, the release of the engagement between the lock pin 405a and the lock hole 402a is not prevented.

As described above, according to the gate valve 401 of the third embodiment, even when the air supply source of the air cylinder apparatus 60 driving the valve body 2 breaks down and when compressed air cannot be supplied from the air supply source to the air cylinder apparatus 60 at the time of transport etc. in the chamber, it becomes possible to hold the vacuum state of the sealed chamber by the valve body 2.

Since the lock mechanism of the third embodiment is driven by the compressed air F supplied to the air cylinder apparatus 60 and then the lock by the lock mechanism is released simultaneously with the opening operation of the valve body 2, the operation of the lock mechanism can be made smooth, and, as a result, the speed of the operation of the gate valve 401 can be raised.

The present invention is not limited to the above embodiments. Various modifications can be adopted. For example, a cylinder apparatus 60 driven by compressed air was mentioned as the cylinder apparatus of the present invention, but the cylinder apparatus of the present invention can be driven by not only compressed air, but also a gas other than compressed air or by a fluid such as pressurized oil.

The gate valve of the present invention is not limited in application to only the vacuum process apparatus illustrated in FIG. 1.

Similarly, the cylinder apparatus of the present invention is not limited in application to only driving a gate valve.

Since the gate valve of the present invention can move the valve rod straight in the state of the first holding portion of the roller receiving member holding the roller, it can reliably move the valve rod, the reliability of operation is high, and, at the same time, high speed movement of the valve rod becomes possible. For this reason, the speed of the opening and closing operation of the opening portion of the sealed chamber by the valve body can be made high.

Further, in the gate valve of the present invention, since the straight movement and inclination of the valve rod are achieved by the roller receiving member moved straight by the driving means via the roller, the structure of the gate valve is very simple and inexpensive.

Further, in the gate valve of the present invention, since the first holding portion, the inclined surface, and the second holding portion of the roller receiving member are continuously formed, the shift from the straight movement to inclination of the valve rod is smooth.

Further, in the gate valve of the present invention, since the roller moves on the first holding portion, inclined surface, and second holding portion of the roller receiving member while rolling, there is no sliding friction, the generation of particles due to abrasion can be suppressed to the maximum extent, and the shortening of service life of the gate valve due to abrasion can be prevented.

Further, in the gate valve of the present invention, since the valve rod is inclined by the inclined surface, due to the wedge effect, the force making the valve body incline is strong and the sealing property of the opening portion can be improved.

According to the gate valve of the present invention, the opening and closing operation and inclination operation of the valve body can be smoothly carried out, the abrasion produced at the time of inclination can be suppressed as much as possible, and a horizontally arranged type gate valve having an improved durability can be obtained.

According to the gate valve of the present invention, further, even when the fluid supply source of the fluid cylinder for driving the valve body breaks down and when compressed fluid cannot be supplied from the fluid supply source to the fluid cylinder at the time of transport etc. in the chamber, it becomes possible to hold the vacuum state of the sealed chamber by the valve body.

Further, according to the gate valve of the present invention, since the lock mechanism is driven by compressed fluid supplied to the cylinder apparatus and the lock by the lock mechanism is released simultaneously with the opening operation of the valve body, the operation of the lock mechanism can be made smooth and, as a result, the speed of operation of the gate valve can be made higher.

The cylinder apparatus of the present invention has a durability against a moment acting upon the piston rod. Further, the cylinder apparatus of the present invention has a simple support structure and can be manufactured at a low cost.

What is claimed is:

1. A gate valve comprising:
   a valve body provided in a sealed chamber, capable of opening and closing an opening portion of the sealed chamber, and capable of sealing the opening portion by inclination with respect to said opening portion,
   a valve rod to one end portion of which said valve body is fixed, held so that it can move straight and incline, provided so as to project from an interior of said sealed chamber to an outside of the sealed chamber, and provided so as to hold the sealed state of said sealed chamber by a sealing means,
   an inclination mechanism connected to said valve rod and inclining the valve rod, and
   a driving means connected to said valve rod via said inclination mechanism and supplying a drive force required for the straight movement and inclination of said valve rod, wherein:
   said inclination mechanism comprises
      a roller rotatably provided on the other end of said valve rod,
      a roller receiving member formed with a first holding portion provided facing the other end portion of said valve rod, capable of holding said roller, and holding said roller when said valve rod moves straight in a direction opening and closing said opening portion, with an inclined surface continuous with the first holding portion, capable of engaging with said roller, and engaging with the roller so as to make said valve rod incline, and with a second holding portion continuous with the inclined surface, capable of holding said roller, and holding the roller when said valve rod is inclined up to a predetermined angle and moved straight by said driving means, and
      a limiting means for limiting the straight movement of said valve rod at a predetermined position at which said valve body closes said opening portion and releasing the holding state of said roller receiving member of said roller by the first holding portion;
      when said roller receiving member is moved straight in a direction closing said opening portion from a state where said valve body opens said opening portion, the roller receiving member moves said valve rod straight to said predetermined position in a state where said roller is held by said first holding portion;
      when said roller receiving member further is moved straight further, the holding state of said roller by said first holding portion is released; and
      the roller is engaged with said inclined surface, said valve rod inclines to seal said opening portion, and when said valve rod is inclined up to a predetermined angle, the roller is held by said second holding portion.

2. A gate valve according to claim 1, wherein: said inclination mechanism has a resilient member for connecting said valve rod and said roller receiving member so as to suppress release of the holding state by said first holding portion of said roller.

3. A gate valve according to claim 1, wherein:

said gate valve further comprises a lock mechanism for holding the sealed state of said opening portion by said valve body;

said driving means is a cylinder apparatus having a piston rod, one end of which is connected to said inclination mechanism via a connection plate, a piston fixed to the other end of the piston rod, and a cylinder unit for accommodating this piston inside this;

said lock mechanism comprises a lock plate which is fixed to said connection plate along a drive direction of said piston rod, on one surface of which an inclined guide surface is formed, and in which a lock hole is formed in a direction perpendicular to the drive direction of said piston rod, a small cylinder provided at a predetermined position with respect to said cylinder apparatus, and a lock piston accommodated in said small cylinder, on one end of which a lock pin capable of being fit in said lock hole by being guided by said inclined guide surface is formed, and the other end of which is biased by a resilient member so as to project to a position at which said lock pin can abut against one surface of said lock plate from said small cylinder;

a supply port for supplying a driving medium for driving said lock piston in a direction in which said lock pin is accommodated in the small cylinder into said small cylinder is formed in said small cylinder;

said supply port is communicated with a supply path for supplying the driving medium for driving said valve body in an opening direction into the cylinder unit of said cylinder apparatus; and when said cylinder apparatus is driven in a direction sealing the opening portion by said valve body, said lock pin is guided by the inclined guide surface of said lock plate and fit in said lock hole, the movement of said connection plate is locked and the sealed state by said valve body is held, and when said cylinder apparatus is driven in a direction opening the opening portion by said valve body, the driving medium is supplied into said small cylinder through the supply path to the cylinder unit of said cylinder apparatus, and an engagement between said lock pin and said lock hole is released.

4. A gate valve according to claim 3, wherein the driving medium of said cylinder apparatus is compressed air.

* * * * *